US008771374B2

(12) United States Patent
Brym et al.

(10) Patent No.: US 8,771,374 B2
(45) Date of Patent: Jul. 8, 2014

(54) METHOD FOR THE PRODUCTION OF LEATHER, COPOLYMERS THAT ARE SUITABLE THEREFOR, AND FURTHER USES THEREOF

(75) Inventors: Markus Brym, Mannheim (DE); Audrey Renoncourt, Ludwigshafen (DE); Stephan Huffer, Ludwigshafen (DE); Gerhard Wolf, Ketsch (DE); Ulrike Mahn, Mannheim (DE); Edward Bohres, Mannheim (DE); Petra Schocker, Burstadt (DE); Hubertus Peter Bell, Mannheim (DE); Peter Danisch, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/479,681

(22) Filed: May 24, 2012

(65) Prior Publication Data
US 2012/0227188 A1    Sep. 13, 2012

Related U.S. Application Data

(62) Division of application No. 12/676,534, filed as application No. PCT/EP2008/061595 on Sep. 3, 2008, now abandoned.

(30) Foreign Application Priority Data

Sep. 4, 2007  (EP) ..................... 07115644
Dec. 10, 2007  (EP) ..................... 07122718
Jul. 15, 2008  (EP) ..................... 08160380
Aug. 27, 2008  (EP) ..................... 08163075

(51) Int. Cl.
*C14C 3/22*    (2006.01)

(52) U.S. Cl.
USPC .......................................... 8/94.18; 8/94.33

(58) Field of Classification Search
USPC .......................................................... 8/94.18
See application file for complete search history.

(56) References Cited

U.S. PATENT DOCUMENTS

| 3,103,447 | A | | 9/1963 | Hatton |
| 3,103,477 | A | | 9/1963 | Mong et al. |
| 3,577,517 | A | | 5/1971 | Kubot et al. |
| 3,919,451 | A | * | 11/1975 | Levy et al. ................. 428/314.2 |
| 4,663,384 | A | | 5/1987 | Penzel et al. |
| 4,923,919 | A | | 5/1990 | Frazee |
| 5,623,067 | A | | 4/1997 | Vandekerckhove |
| 6,200,640 | B1 | * | 3/2001 | Kneip et al. ................... 427/389 |
| 6,313,224 | B1 | * | 11/2001 | Singer et al. ................... 525/208 |
| 6,433,252 | B1 | | 8/2002 | Kriz et al. |
| 2003/0083431 | A1 | * | 5/2003 | Harris et al. .................. 524/832 |
| 2010/0069597 | A1 | | 3/2010 | Venkatesh |
| 2010/0192307 | A1 | | 8/2010 | Brym et al. |
| 2010/0199439 | A1 | | 8/2010 | Brym et al. |

FOREIGN PATENT DOCUMENTS

| DE | 2 308 151 | 8/1974 |
| EP | 0 348 565 A | 1/1990 |
| EP | B 0 459 168 | 4/1991 |
| EP | 1 022 344 A | 7/2000 |
| EP | 1 087 021 | 3/2001 |
| WO | WO 93/17130 | 9/1993 |
| WO | WO 96/25863 | 8/1996 |
| WO | WO 98/41581 | 9/1998 |
| WO | WO 02/38638 | 5/2002 |
| WO | WO 03/023069 | 3/2003 |
| WO | WO2008/055858 | 5/2008 |
| WO | WO 01/68584 | 9/2011 |

OTHER PUBLICATIONS

International Search Report for PCT/EP2008/061595, mailed Dec. 3, 2008.

* cited by examiner

*Primary Examiner* — Harold Pyon
*Assistant Examiner* — Katie L Hammer
(74) *Attorney, Agent, or Firm* — Drinker Biddle & Reath LLP

(57) ABSTRACT

Process for the production of leather, wherein pelts, pickled pelts or semifinished products are treated with at least one copolymer (A) which is obtainable by copolymerization of the following comonomers:
(a) at least one ethylenically unsaturated $C_3$-$C_{10}$-carboxylic acid or at least one ethylenically unsaturated $C_4$-$C_{10}$-dicarboxylic acid or its anhydride,
(b) at least one (meth)acrylate of an α-branched $C_3$-$C_{10}$-alkanol,
(c) at least one (meth)acrylate of a primary $C_4$-$C_{20}$-alkanol.

8 Claims, No Drawings

METHOD FOR THE PRODUCTION OF LEATHER, COPOLYMERS THAT ARE SUITABLE THEREFOR, AND FURTHER USES THEREOF

CROSS REFERENCE TO RELATED APPLICATIONS

This application is a divisional application of U.S. Ser. No. 12/676,534, now pending, which is a national phase of PCT/EP2008/061595, filed Sep. 3, 2008, which claims priority to EP 07115644.2 filed Sep. 4, 2007, EP 07122718.5 filed Dec. 10, 2007, EP 08160380.5 filed Jul. 15, 2008 and EP 08163075.8 filed Aug. 27, 2008, in which the entire contents of all of the applications are hereby incorporated by reference.

The present invention relates to a process for the production of leather, wherein pelts, pickled pelts or semifinished products are treated with at least one copolymer (A) which is obtainable by copolymerization of the following comonomers:

(a) at least one ethylenically unsaturated $C_3$-$C_{10}$-carboxylic acid or at least one ethylenically unsaturated $C_4$-$C_{10}$-dicarboxylic acid or its anhydride, (b) at least one (meth)acrylate of an α-branched $C_3$-$C_{10}$-alkanol, (c) at least one (meth)acrylate of a primary $C_4$-$C_{20}$-alkanol.

The present invention furthermore relates to the leathers produced according to the invention and their use.

The present invention furthermore relates to copolymers obtainable by copolymerization of the following comonomers:

(a) at least one ethylenically unsaturated $C_3$-$C_{10}$-carboxylic acid or at least one ethylenically unsaturated $C_4$-$C_{10}$-dicarboxylic acid or its anhydride, (b) at least one methacrylate of an α-branched $C_3$-$C_{10}$-alkanol, (c) at least one acrylate of a primary $C_4$-$C_{20}$-alkanol.

The present invention furthermore relates to a process for the preparation of copolymers according to the invention and to further uses thereof.

For the production of leather, polymers can be used during the pretanning, main tanning and retanning. The polymers may perform different functions. Thus, they may have, for example, a tanning, retanning, water-repellent, fatliquoring or dispersing effect. The choice of the polymers can influence the properties of the leather end product. Various proposals are made in the literature regarding the choice of the polymers.

EP-A 0 628 085 describes the use of copolymers of maleic anhydride and optionally a second monomer, for example styrene, isobutene or vinyl acetate, the copolymers being reacted with alkoxylated alcohols before the use for retanning and filling.

EP 1 087 021 describes the use of copolymers which are prepared from a hydrophilic monomer component, such as, for example, acrylic acid, methacrylic acid, acrylamide, methacrylamide or maleic anhydride, and a hydrophobic monomer component, such as, for example, $C_8$-$C_{22}$-alkyl acrylate or $C_8$-$C_{22}$-alkyl methacrylate, and which are neutralized. The copolymers are used as the component in polysiloxane-containing leather treatment compositions. However, it is observed that leathers produced with the leather treatment compositions reported in EP 1 087 021 have in some cases diffusion-related inhomogeneities in the fat distribution and hence an irregular dyeing. Moreover, some of the leathers produced according to EP 1 087 021 have a tendency toward a loose-grained character or double-skin character.

It was the object to provide a process for the production of leather which avoids the disadvantages described above. It was furthermore the object to provide suitable assistants with which leathers can be produced. Finally, it was the object to provide leathers which have a very low tendency to form silicone or grease spots.

Accordingly, the process defined at the outset was found, which is also referred to as process according to the invention in the context of the present invention.

To carry out the production according to the invention of leather, pelts, pickled pelts or semifinished products are usually used as starting materials.

For carrying out the process according to the invention, pelts, pickled pelts or semifinished products are treated with at least one copolymer which is obtainable by preferably free radical copolymerization of (a) at least one ethylenically unsaturated $C_3$-$C_{10}$-carboxylic acid or at least one ethylenically unsaturated $C_4$-$C_{10}$-dicarboxylic acid or its anhydride, also referred to as ethylenically unsaturated $C_3$-$C_{10}$-carboxylic acid (a) and ethylenically unsaturated $C_4$-$C_{10}$-dicarboxylic acid (a) or anhydride (a), respectively, for short in the context of the present invention, (b) at least one (meth)acrylate of an α-branched $C_3$-$C_{10}$-alkanol, also referred to as comonomer (b) for short in the context of the present invention, (c) at least one (meth)acrylate of a primary $C_4$-$C_{20}$-alkanol, also referred to as comonomer (c) for short in the context of the present invention.

In the context of the present invention, abovementioned copolymer (A) is also referred to as copolymer according to the invention.

Copolymer (A) may be block copolymers, graft copolymers or preferably random copolymers.

Examples of ethylenically unsaturated $C_4$-$C_{10}$-carboxylic acids (a) are α,β-unsaturated carboxylic acids, such as, for example, (E)- or (Z)-crotonic acid and in particular (meth)acrylic acid.

Examples of ethylenically unsaturated $C_4$-$C_{10}$-dicarboxylic acids (a) are maleic acid, fumaric acid, itaconic acid, citraconic acid, metaconic acid, methylenemalonic acid, preferably itaconic acid, fumaric acid and maleic acid and very particularly preferably maleic acid.

Examples of anhydrides (a) are maleic anhydride, itaconic anhydride, citraconic anhydride, methylenemalonic anhydride, preferably itaconic anhydride and maleic anhydride and very particularly preferably maleic anhydride.

In an embodiment of the present invention, copolymer (A) may comprise two or more different ethylenically unsaturated $C_3$-$C_{10}$-carboxylic acids (a) or two or more different ethylenically unsaturated $C_4$-$C_{10}$-dicarboxylic acids (a) or two or more different anhydrides (a) incorporated in the form of polymerized units.

In an embodiment of the present invention, copolymer (A) may comprise an ethylenically unsaturated $C_3$-$C_{10}$-carboxylic acid (a) and an ethylenically unsaturated $C_4$-$C_{10}$-dicarboxylic acid (a) or an anhydride (a) incorporated in the form of polymerized units.

However, copolymer (A) preferably comprises only one ethylenically unsaturated $C_3$-$C_{10}$-carboxylic acid (a) or one ethylenically unsaturated $C_4$-$C_{10}$-dicarboxylic acid (a) or one anhydride (a) incorporated in the form of polymerized units.

Copolymer (A) furthermore comprises at least one comonomer (b) incorporated in the form of polymerized units. Comonomer (b) is a (meth)acrylate of an α-branched $C_3$-$C_{10}$-alkanol. In the context of the present invention, α-branched $C_3$-$C_{10}$-alkanols are understood as meaning secondary alkanols having 3 to 10 carbon atoms and preferably tertiary alkanols having 4 to 10 carbon atoms, which may be cyclic or preferably acyclic. The term alkanols therefore includes cycloalkanols. Examples of secondary alkanols having 3 to 10 carbon atoms are isopropanol, sec-butanol, sec-pentanol (pentan-2-ol), pentan-3-ol, cyclopentanol, cyclohexanol, sec-hexanol (hexan-2-ol), hexan-3-ol, sec-heptanol (heptan-2-ol), heptan-3-ol, sec-decanol and decan-3-ol. Preferred examples are tert-butanol and tert-amyl alcohol.

In a variant of the present invention, copolymer (A) comprises two or more different comonomers (b) incorporated in the form of polymerized units.

However, it is preferable if copolymer (A) comprises only one comonomer (b) incorporated in the form of polymerized units.

Particularly preferred comonomers (b) are tert-amyl (meth)acrylate, tert-butyl acrylate and in particular tert-butyl methacrylate.

Copolymer (A) furthermore comprises at least one comonomer (c) incorporated in the form of polymerized units. Comonomer (c) is a (meth)acrylate of a primary $C_4$-$C_{20}$-alkanol, preferably of a primary $C_6$-$C_{18}$-alkanol. In the context of the present invention, primary $C_4$-$C_{20}$-alkanols are straight-chain or preferably branched primary alcohols which have a primary OH group. Examples of primary $C_4$-$C_{20}$-alkanols are n-butanol, n-pentanol, n-hexanol, n-heptanol, n-octanol, n-nonanol, n-decanol, n-dodecanol, n-tetradecanol, n-hexadecanol, n-octadecanol and n-eicosanol. Examples of branched primary $C_4$-$C_{20}$-alkanols are isobutanol, isopentanol, isohexanol, isooctanol, isostearyl alcohol and isopalmityl alcohol. Examples of preferred primary $C_6$-$C_{18}$-alkanols are 2-ethylhexyl alcohol, 3-n-propylheptyl alcohol, 2-n-propylheptanol, 3-isopropylheptyl alcohol, isooctanol, isostearyl alcohol and isopalmityl alcohol.

In an embodiment of the present invention; at least one comonomer (c) is a (meth)acrylate of a primary β- or γ-(gamma-) branched $C_4$-$C_{20}$-alcohol; 2-ethylhexyl alcohol, 2-n-propylheptanol, 3-n-propylheptyl alcohol and 3-isopropylheptyl alcohol are very particularly preferred.

In a variant of the present invention, copolymer (A) comprises two or more different comonomers (c) incorporated in the form of polymerized units.

However, it is preferable if copolymer (A) comprises only one comonomer (c) incorporated in the form of polymerized units.

In an embodiment of the present invention, copolymer (A) is a copolymer which is obtainable by copolymerization of
(a) altogether from 5 to 30% by weight, preferably from 10 to 25% by weight, of ethylenically unsaturated $C_3$-$C_{10}$-carboxylic acid or ethylenically unsaturated $C_4$-$C_{10}$-dicarboxylic acid or its anhydride,
(b) altogether from 5 to 30% by weight, preferably from 10 to 20% by weight, of a (meth)acrylate of an α-branched $C_3$-$C_{10}$-alkanol,
(c) altogether from 40 to 90% by weight, preferably from 55 to 80% by weight, of a (meth)acrylate of a primary $C_4$-$C_{20}$-alkanol.

Data in % by weight are based on the sum of comonomer (b) and comonomer (c) and ethylenically unsaturated $C_3$-$C_{10}$-carboxylic acid (a) or ethylenically unsaturated $C_4$-$C_{10}$-dicarboxylic acid (a) or anhydride (a) incorporated in the form of polymerized units.

In a preferred embodiment of the present invention, at least one comonomer (b) is a methacrylate of a tertiary $C_4$-$C_{10}$-alkanol and at least one comonomer (c) is an acrylate of a primary β- or γ-branched $C_4$-$C_{20}$-alcohol.

In an embodiment of the present invention, copolymer (A) may comprise one or more further comonomers (d) incorporated in the form of polymerized units. Examples of suitable comonomers (d) are vinyl esters of $C_1$-$C_{10}$-carboxylic acids; vinyl formate, vinyl propionate and in particular vinyl acetate are preferred. Further examples of suitable comonomers (d) are vinylaromatics, such as, for example, α-methylstyrene, para-methylstyrene and in particular styrene. Further examples of suitable comonomers (d) are $C_6$-$C_{30}$-α-olefins, for example 1-hexene, 1-octene, 1-decene, 1-n-$C_{16}H_{32}$, 1-n-$C_{18}H_{36}$, 1-eicosene and 1-n-docosanol.

In an embodiment of the present invention, copolymer (A) comprises altogether up to 50% by weight, preferably from 1 to 30% by weight, of a further comonomer (d) incorporated in the form of polymerized units, based on the sum of comonomer (b) and comonomer (c) and ethylenically unsaturated $C_3$-$C_{10}$-carboxylic acid (a) or ethylenically unsaturated $C_4$-$C_{10}$-dicarboxylic acid (a) or anhydride (a).

In a preferred embodiment of the present invention, copolymer (A) comprises no comonomer (d) incorporated in the form of polymerized units.

In an embodiment of the present invention, copolymer (A) has a dynamic viscosity at room temperature in the range from 50 to 4000 mPa·s, preferably in the range from 75 to 2500 mPa·s, determined according to DIN EN ISO 2555 (Brookfield DV-E viscometer, spindle No. 3 of the RV spindle set, 50 rpm).

In an embodiment of the present invention, copolymer (A) is used as free acid in the process according to the invention. In a further embodiment in which an anhydride (a) has been chosen as the comonomer, comonomer according to the invention can be used in unhydrolyzed form.

Preferably, ethylenically unsaturated $C_3$-$C_{10}$-carboxylic acid (a) incorporated in the form of polymerized units or ethylenically unsaturated $C_4$-$C_{10}$-dicarboxylic acid (a) incorporated in the form of polymerized units is present in at least partly neutralized form.

In another preferred variant of the present invention, the anhydride of ethylenically unsaturated $C_4$-$C_{10}$-dicarboxylic acid (a) which is incorporated in the form of polymerized units is present in at least partly hydrolyzed and, if appropriate, at least partly neutralized form. In a special variant, copolymer (A) may be present in completely neutralized form.

For neutralization, hydroxide and/or carbonate and/or bicarbonate of alkali metal or alkaline earth metal can preferably be used, for example sodium hydroxide, potassium hydroxide, sodium carbonate, potassium carbonate, sodium bicarbonate, potassium bicarbonate, magnesium hydroxide, magnesium carbonate, calcium bicarbonate or magnesium bicarbonate.

For hydrolysis and, if appropriate, at least partial neutralization of anhydride (a), hydroxide and/or carbonate and/or bicarbonate of alkali metal or alkaline earth metal can preferably be used. "Neutralization of anhydride (a)" is to be understood as meaning the neutralization of the carboxyl groups forming in the hydrolysis of anhydride (a) incorporated in the form of polymerized units.

The process according to the invention for the production of leather can be carried out as a process for pretanning or tanning, in which case it is also referred to below as tanning process according to the invention. The tanning process according to the invention starts from hides pretreated by conventional methods, the so-called pelts, of animals such as, for example, cattle, pigs, goats or deer. It is not important for the process according to the invention whether the animals were killed by slaughtering for example or slain by hunters or died of natural causes. The conventional methods for the pretreatment include, for example, liming, deliming, bating and pickling and mechanical operations, for example the fleshing of the hides.

The process according to the invention can be carried out in aqueous liquor. Suitable liquor lengths are from 50 to 250%.

For carrying out the process according to the invention, for example, from 0.1 to 10% by weight of copolymer (A), based on the split weight of the relevant pelt, pickled pelt or relevant semifinished product, can be added.

The tanning process according to the invention is carried out in general in a manner such that one or more copolymers (A) are added in one portion or in a plurality of portions immediately before or during the tanning step. The tanning process according to the invention is preferably carried out at a pH of from 2.5 to 4, it frequently being observed that the pH increases by about 0.3 to three units while the tanning process according to the invention is being carried out. The pH can also be increased by about 0.3 to three units by addition of basifying agents.

The tanning process according to the invention is carried out in general at temperatures of from 10 to 45° C., preferably at from 20 to 30° C. A duration of from 10 minutes to 12 hours has proven useful, and from one to three hours are preferred. The tanning process according to the invention can be carried out in any desired vessels customary in tanning, for example by drumming in barrels or in rotated drums.

In a variant of the tanning process according to the invention, copolymer (A) is used together with one or more conventional tanning agents, for example with chrome tanning agents, mineral tanning agents, syntans, polymer tanning agents or vegetable tanning agents, as described, for example, in *Ullmann's Encyclopedia of Industrial Chemistry*, volume A15, pages 259 to 282 and in particular page 268 et seq., 5th edition (1990), Verlag Chemie Weinheim. The weight ratio of copolymer (A):conventional tanning agent or sum of the conventional tanning agents is expediently from 0.01:1 to 100:1. In an advantageous variant of the process according to the invention, only a few ppm of the conventional tanning agents are added to the copolymers described above. However, it is particularly advantageous completely to dispense with admixing conventional tanning agents.

In a variant of the tanning process according to the invention, copolymer (A) is added in one portion or in a plurality of portions before or during the pretanning, in a particular variant in the pickle itself.

The process according to the invention for the production of leather can preferably be carried out as a process for the retanning of leather using copolymer (A), also referred to below as retanning process according to the invention. The retanning process according to the invention starts from conventionally tanned semifinished products, i.e. for example semifinished products tanned with chrome tanning agents, mineral tanning agents, polymer tanning agents, aldehydes, syntans or resin tanning agents. For carrying out the retanning process according to the invention, copolymer (A) is allowed to act on semifinished products.

In a variant, it is possible to start from semifinished products which have been produced by the tanning process according to the invention.

The retanning process according to the invention can be carried out under otherwise customary conditions. Expediently, one or more, i.e. for example from 2 to 6, treatment steps are chosen and washing with water can be effected between the treatment steps. The temperature during the individual treatment steps is in each case in the range from 5 to 60° C., preferably from 20 to 45° C. Expediently, further compositions usually used during the retanning are employed, for example fatliquors, retanning agents based on resin and vegetable tanning agents, fillers, leather dyes or emulsifiers.

A further aspect of the present invention relates to leathers produced by the tanning process according to the invention or the retanning process according to the invention or by a combination of tanning process according to the invention and retanning process according to the invention. The leathers according to the invention are distinguished by a generally advantageous quality; for example, they are particularly soft and tight-grained. The leathers according to the invention comprise copolymer (A) and, if appropriate, leather dye used, distributed particularly uniformly over the cross section. In addition, leathers according to the invention do not tend to form fat spots.

A further aspect of the present invention is the use of the leathers according to the invention for the production of articles of apparel, pieces of furniture or interior automotive parts. In the context of the present invention, articles of apparel are, for example, jackets, pants, shoes, belts or suspenders. In relation to the present invention, all pieces of furniture which comprise constituents of leather may be mentioned under pieces of furniture. Seating may be mentioned by way of example, such as, for example, armchairs, chairs or sofas. Automobile seats, steering wheel coverings and coverings of dashboards may be mentioned by way of example as interior automotive parts.

A further aspect of the present invention relates to articles of apparel comprising the leathers according to the invention or produced from leathers according to the invention. A further aspect of the present invention relates to furniture comprising the leathers according to the invention or produced from leathers according to the invention. A further aspect of the present invention relates to interior automotive parts comprising the leathers according to the invention or produced from leathers according to the invention.

A further aspect of the present invention relates to aqueous formulations, for example aqueous solutions, dispersions or in particular emulsions, comprising at least one copolymer (A). In the context of the present invention, such aqueous formulations are also referred to for short as aqueous formulations according to the invention. Aqueous formulations according to the invention are very particularly suitable for carrying out the process according to the invention.

In an embodiment of the present invention, aqueous formulations according to the invention have a solids content in the range from 10 to 85%, preferably from 20 to 65%, particularly preferably at least 25%, by weight.

In an embodiment of the present invention, aqueous formulations according to the invention have a pH in the range from 3 to 10, preferably in the range from 4 to 8.

A further aspect of the present invention relates to copolymers (A), also referred to as copolymers according to the invention in the context of the present invention. A copolymer according to the invention is obtainable by copolymerization of the following comonomers:

(a) at least one ethylenically unsaturated $C_3$-$C_{10}$-carboxylic acid or at least one ethylenically unsaturated $C_4$-$C_{10}$-dicarboxylic acid or its anhydride, (b) at least one methacrylate of an α-branched $C_3$-$C_{10}$-alkanol, (c) at least one acrylate of a primary $C_4$-$C_{20}$-alkanol.

In an embodiment of the present invention, at least one comonomer (b) is a methacrylate of a tertiary $C_4$-$C_{10}$-alkanol.

In an embodiment of the present invention, at least one comonomer (c) is an acrylate of a primary β- or γ-branched $C_4$-$C_{20}$-alcohol.

In an embodiment of the present invention, at least one comonomer (b) is a methacrylate of a tertiary $C_4$-$C_{10}$-alkanol and at least one comonomer (c) is an acrylate of a primary β- or γ-branched $C_4$-$C_{20}$-alcohol.

In an embodiment of the present invention, a copolymer according to the invention is obtainable by copolymerization of
  (a) altogether from 5 to 30% by weight, preferably from 10 to 25% by weight, of ethylenically unsaturated $C_3$-$C_{10}$-carboxylic acid or ethylenically unsaturated $C_4$-$C_{10}$-dicarboxylic acid or its anhydride,
  (b) altogether from 5 to 30% by weight, preferably from 10 to 20% by weight, of a methacrylate of an α-branched $C_3$-$C_{10}$-alkanol,
  (c) altogether from 40 to 90% by weight, preferably from 55 to 80% by weight, of an acrylate of a primary $C_4$-$C_{20}$-alkanol.

Data in % by weight are based on the sum of comonomer (b) and comonomer (c) and ethylenically unsaturated $C_3$-$C_{10}$-carboxylic acid (a) or ethylenically unsaturated $C_4$-$C_{10}$-dicarboxylic acid (a) or anhydride (a) incorporated in the form of polymerized units.

In an embodiment of the present invention, copolymer according to the invention may comprise one or more further comonomers (d) incorporated in the form of polymerized units. Examples of suitable comonomers (d) are vinyl esters of $C_1$-$C_{10}$-carboxylic acids; vinyl formate, vinyl propionate and in particular vinyl acetate are preferred. Further examples of suitable comonomers (d) are vinylaromatics, such as, for example, α-methylstyrene, para-methylstyrene and in particular styrene. Further examples of suitable comonomers (d) are $C_5$-$C_{30}$-α-olefins, for example 1-hexene, 1-octene, 1-decene, 1-n-$C_{16}H_{32}$, 1-n-$C_{18}H_{36}$, 1-eicosene and 1-n-docosanol.

In an embodiment of the present invention, copolymer according to the invention comprises altogether up to 50% by weight, preferably from 1 to 30% by weight, of further comonomer (d) incorporated in the form of polymerized units, based on the sum of comonomer (b) and comonomer (c) and ethylenically unsaturated $C_3$-$C_{10}$-carboxylic acid (a) or ethylenically unsaturated $C_4$-$C_{10}$-dicarboxylic acid (a) or anhydride (a).

In a preferred embodiment of the present invention, copolymer according to the invention comprises no comonomer (d) incorporated in the form of polymerized units.

In an embodiment of the present invention, copolymer according to the invention has, at room temperature, a dynamic viscosity in the range from 50 to 4000 mPa·s, preferably in the range from 75 to 2500 mPa·s, determined according to DIN EN ISO 2555.

Copolymer according to the invention may be a block copolymer, a graft copolymer or preferably a random copolymer.

In an embodiment of the present invention, ethylenically unsaturated $C_3$-$C_{10}$-carboxylic acid (a) incorporated in the form of polymerized units or ethylenically unsaturated $C_4$-$C_{10}$-dicarboxylic acid (a) incorporated in the form of polymerized units is present in at least partly neutralized form.

In an embodiment of the present invention, the anhydride of ethylenically unsaturated $C_4$-$C_{10}$-dicarboxylic acid (a) which is incorporated in the form of polymerized units is present in at least partly hydrolyzed and, if appropriate, at least partly neutralized form.

Further properties of copolymer (A) or copolymer according to the invention are described above.

Copolymers according to the invention are particularly suitable for carrying out the process according to the invention.

A further aspect of the present invention relates to a process for the preparation of copolymers according to the invention, also referred to as preparation process according to the invention in the context of the present invention. For carrying out the preparation process according to the invention, it is possible to adopt a procedure in which the following are subjected to free radical polymerization with one another:
  (a) at least one ethylenically unsaturated $C_3$-$C_{10}$-carboxylic acid or at least one ethylenically unsaturated $C_4$-$C_{10}$-dicarboxylic acid or its anhydride,
  (b) at least one methacrylate of an α-branched $C_3$-$C_{10}$-alkanol,
  (c) at least one acrylate of a primary $C_4$-$C_{20}$-alkanol.

In an embodiment of the present invention, a procedure is adopted in which the following are subjected to free radical copolymerization with one another:
  (a) altogether from 5 to 30% by weight, preferably from 10 to 25% by weight, of ethylenically unsaturated $C_3$-$C_{10}$-carboxylic acid or ethylenically unsaturated $C_4$-$C_{10}$-dicarboxylic acid or its anhydride,
  (b) altogether from 5 to 30% by weight, preferably from 10 to 20% by weight, of a methacrylate of an α-branched $C_3$-$C_{10}$-alkanol,
  (c) altogether from 40 to 90% by weight, preferably from 55 to 80% by weight, of an acrylate of a primary $C_4$-$C_{20}$-alkanol.

Data in % by weight are based on the sum of comonomer (b) and comonomer (c) and ethylenically unsaturated $C_3$-$C_{10}$-carboxylic acid (a) or ethylenically unsaturated $C_4$-$C_{10}$-dicarboxylic acid (a) or anhydride (a) incorporated in the form of polymerized units.

Regarding comonomer (d) which, if appropriate, is to be incorporated in the form of polymerized units, the statements made above are applicable.

The preparation process according to the invention can be carried out as a solution polymerization or as a mass polymerization. However it is particularly preferable to carry out the preparation process according to the invention as an emulsion polymerization, and in a special variant also as a copolymerization in miniemulsion.

Below, the term emulsion polymerization is used even when a plurality of comonomers are employed. Below, the term emulsion polymerization therefore also comprises emulsion copolymerizations.

It is possible to choose various emulsion polymerization procedures for the preparation of copolymer according to the invention, for example a batch process (discontinuous) or semicontinuous or fully continuous processes, such as feed processes.

So-called seed procedures, as described, for example, in EP 0 810 831, are also suitable. Copolymers according to the invention having particularly readily reproducible particle diameter distribution can be produced by the seed procedure.

Copolymerization is usually effected using at least one initiator. At least one initiator may be a peroxide. Examples of suitable peroxides are alkali metal peroxodisulfates such as, for example, sodium peroxodisulfate, ammonium peroxodisulfate, hydrogen peroxide, organic peroxides, such as diacetyl peroxide, di-tert-butyl peroxide, diamyl peroxide, dioctanoyl peroxide, didecanoyl peroxide, dilauroyl peroxide, dibenzoyl peroxide, bis(o-toluoyl) peroxide, succinyl peroxide, tert-butyl peracetate, tert-butyl permaleate, tert-butyl perisobutyrate, tert-butyl perpivalate, tert-butyl peroctanoate, tert-butyl perneodecanoate, tert-butyl perbenzoate, di-tert-butyl peroxide, tert-butyl hydroperoxide, cumyl hydroperoxide, tert-butyl peroxy-2-ethylhexanoate and diisopropyl peroxidicarbamate. Azo compounds, such as, for example, azobisisobutyronitrile, azobis(2-amidopropane)dihydrochloride and 2,2'-azobis(2-methylbutyronitrile) are also suitable.

Redox initiators are likewise suitable, for example comprising peroxides and oxidizable sulfur compound. Systems comprising acetone bisulfite and organic peroxide, such as tert-$C_4H_9$—OOH, $Na_2S_2O_5$ (sodium disulfite) and organic peroxide, such as tert-$C_4H_9$—OOH or HO—$CH_2SO_2$Na, and organic peroxide, such as tert-$C_4H_9$—OOH, are very particularly preferred. Systems such as, for example, ascorbic acid/$H_2O_2$ are also particularly preferred.

Peroxidic salts, for example alkali metal salts of peroxodisulfate, in particular $K_2S_2O_8$ and $Na_2S_2O_8$, are very particularly suitable.

Temperatures in the range from 20 to 105° C., preferably from 55 to 100° C., can be chosen as the polymerization temperature or temperature at which the preparation process according to the invention is carried out. The chosen temperature is dependent on the decomposition characteristic of the initiator used or of the initiators used.

Temperatures in the range from 10 to 105° C., preferably from 20 to 50° C., can be chosen as the temperature at which the subsequent neutralization is carried out.

The pressure conditions are in general not critical and, for example, pressures in the range from atmospheric pressure to 10 bar are suitable.

It is possible to use at least one emulsifier which may be anionic, cationic or nonionic.

Customary nonionic emulsifiers are, for example, ethoxylated mono-, di- and trialkylphenols (degree of ethoxylation: 3 to 50, alkyl radical: $C_4$-$C_{12}$) and ethoxylated fatty alcohols (degree of ethoxylation: 3 to 80; alkyl radical: $C_8$-$C_{36}$). Examples are the Lutensol® brands from BASF Aktiengesellschaft and the Triton® brands from Union Carbide.

Customary anionic emulsifiers are, for example, alkali metal and ammonium salts of alkyl sulfates (alkyl radical: $C_8$ to $C_{12}$), of sulfuric acid monoesters of ethoxylated alkanols (degree of ethoxylation: 4 to 30, alkyl radical: $C_{12}$-$C_{18}$) and of ethoxylated alkylphenols (degree of ethoxylation: 3 to 50, alkyl radical: $C_4$-$C_{12}$), of alkanesulfonic acids (alkyl radical: $C_{12}$-$C_{18}$) and of alkylarylsulfonic acids (alkyl radical: $C_9$-$C_{13}$).

Suitable cationic emulsifiers are as a rule primary, secondary, tertiary or quaternary ammonium salts having a $C_6$-$C_{18}$-alkyl, $C_6$-$C_{1s}$-aralkyl or heterocyclic radical, alkanolammonium salts, pyridinium salts, imidazolinium salts, oxazolinium salts, morpholinium salts, thiazolinium salts and salts of amine oxides, quinolinium salts, isoquinolinium salts, tropylium salts, sulfonium salts and phosphonium salts. Dodecylammonium acetate or the corresponding hydrochloride, the chlorides or acetates of various 2-(N,N,N-trimethylammonium)ethylparaffinic acid esters, N-cetylpyridinium chloride, N-laurylpyridinium sulfate and Akcetyl-N,N,N-trimethylammonium bromide, N-dodecyl-N,N,N-trimethylammonium bromide, N,N-distearyl-N,N-dimethylammonium chloride and the Gemini surfactant N,N-(lauryldimethyl)ethylenediamine dibromide may be mentioned by way of example. Numerous further examples appear in H. Stache, *Tensid-Taschenbuch*, Carl-Hanser-Verlag, Munich, Vienna, 1981, and in McCutcheon's, *Emulsifiers & Detergents*, MC Publishing Company, Glen Rock, 1989.

Of course, further additives which are customary in emulsion polymerization may be added to the reaction mixture, for example glycols, polyethylene glycols, protective colloids and buffer/pH regulators.

For example, a duration in the range from 30 minutes to 12 hours, preferably from 2 to 5 hours, may be chosen as the duration for the emulsion polymerization.

After the actual copolymerization, deodorization may be effected, for example by addition of initiator which is identical or different from the initiator used in the actual copolymerization.

In an embodiment of the present invention, the copolymerization takes place substantially completely. The composition of copolymers according to the invention does not differ measurably from the composition of the comonomers.

In an embodiment of the present invention, the process according to the invention is carried out in the manner of a one-stage process. In the context of the present invention, one-stage process is to be understood as meaning, for example, batch processes and feed processes in which a proportion of the comonomers can be initially taken and proportions of the comonomers are added during the copolymerization (feed), the composition of the feed in relation to the comonomers remaining substantially constant during the copolymerization.

In another embodiment of the present invention, the process according to the invention is carried out in the manner of a step procedure. In the context of the present invention, this is to be understood as meaning continuous or batchwise feed processes in which the composition of the feed changes during the emulsion polymerization.

Copolymers according to the invention which are prepared by the process according to the invention are usually obtained in the form of aqueous dispersions which—as mentioned above—are likewise a subject of the present invention and from which the copolymers according to the invention can be isolated by methods known per se, such as, for example, removal of the water by, for example, evaporation or filtration.

The present invention furthermore relates to aqueous formulations which, in addition to copolymer according to the invention, comprise at least one silicone compound (B). In an embodiment of the present invention, silicone compound (B) is a polysiloxane which has one or more carboxyl groups per molecule.

In an embodiment, polysiloxanes which have one or more carboxyl groups per molecule are those which have structural elements of the formulae I and II and optionally structural elements III a and/or III b.

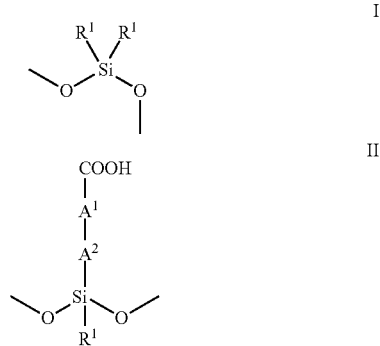

-continued

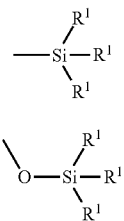

The structural elements designated above are arranged in each case so that Si—O—Si—O chains are formed. The formation of Si—Si groups is theoretically possible but plays a minor role in most cases.

In the formulae I, II, III a and III b, the variables are defined as follows:
$R^1$ is identical or different and, independently of one another, is
hydrogen,
hydroxyl,
$C_1$-$C_4$-alkyl, such as methyl, ethyl, n-propyl, isopropyl, n-butyl, isobutyl, sec-butyl and tert-butyl; in particular methyl;
$C_6$-$C_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;
$C_1$-$C_4$-alkoxy, such as methoxy, ethoxy, n-propoxy, isopropoxy, n-butoxy, isobutoxy, sec-butoxy, tert-butoxy;
amino,
mono-$C_1$-$C_4$-alkylamino, for example —$NHCH_3$, —$NHC_2H_5$, —$NH(CH_2)_2CH_3$, —$NH(CH_2)_3CH_3$, —$NH$—$CH(CH_3)_2$, $NHC(CH_3)_3$;
di-$C_1$-$C_4$-alkylamino, —$N(CH_3)_2$, —$N(C_2H_5)_2$, —$N(CH_3)(C_2H_5)$, —$N[(CH_2)_2CH_3]_2$, —$N(CH_3)CH(CH_3)_2$,
or $A^2$-$A^1$-COOH.

In a preferred embodiment of the present invention, all $R^1$ are identical and are in each case methyl.

In another preferred embodiment, the structural elements I are in each case identical, in I in each case one $R^1$ being methyl and the other $R^1$ being phenyl.

In an embodiment of the present invention the structural elements of the formula III a are selected from the following groups: $Si(CH_3)_3$, $Si(CH_3)_2C_6H_5$, $Si(CH_3)_2OH$, $Si(CH_3)C_6H_5OH$.

In one embodiment of the present invention, in each case two $R^1$ are identical in the structural elements of the formula III a or III b and are selected from $CH_3$ and $C_8H_5$, and the third $R^1$ is $A^2$-$A^1$-COOH.

$A^1$ is identical or different and is linear or branched $C_5$-$C_{25}$-alkylene, unsubstituted or substituted by one or more $C_1$-$C_4$-alkyl or phenyl, for example
—$(CH_2)_5$—, —$(CH_2)_5$—, —$(CH_2)_7$—, —$(CH_2)_8$—, —$(CH_2)_9$—, —$(CH_2)_{10}$—, —$(CH_2)_{11}$—, —$(CH_2)_{12}$—, —$(CH_2)_{13}$—, —$(CH_2)_{14}$—, —$CH(CH_3)$—$CH_2$—$CH_2$—$CH_2$—$CH(CH_3)$—, —$C(CH_3)_2$—$CH_2$—$CH_2$—$CH_2$—$CH(CH_3)$—; —$CH(C_6H_5)$—$CH_2$—$CH_2$—$CH_2$—$CH(CH_3)$—;
preferably —$(CH_2)_8$—, —$(CH_2)_9$—, —$(CH_2)_{10}$—, —$(CH_2)_{11}$—, —$(CH_2)_{12}$—, it being possible for $C_5$-$C_{25}$-alkylene to be interrupted by 1 to 8 O atoms not directly linked to one another.

$A^2$ is
a direct bond,
oxygen,
an amino group of the formula —$NR^2$— a carbonyl group,
an amido group of the formula —$NR^2$—CO— or —CO—$NR^2$— or
an ester group of the formula CO—O or O—CO;
$R^2$ is identical or different and independently of one another, is selected from hydrogen,
$C_1$-$C_4$-alkyl, such as methyl, ethyl, n-propyl, isopropyl, n-butyl, isobutyl, sec-butyl and tert-butyl.

Polysiloxanes which comprise the structural elements of the general formulae I, II and optionally III a and/or III b may be linear or may have a cyclic or branched structure. Branched polysiloxanes which comprise the structural elements I, II and optionally III a and/or III b generally additionally comprise structural elements, for example, of the formula IV a or IV b

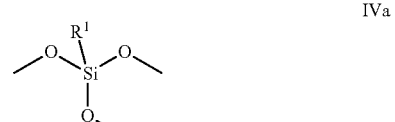

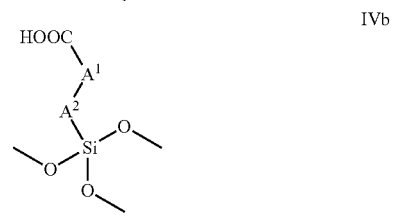

in which the variables are defined as above. Cyclic straight-chain polysiloxanes which comprise the structural elements of the general formulae I, II usually comprise no structural elements of the formulae III a and III b.

The structural elements I, II, optionally IV a and IV b may be distributed alternately, blockwise and preferably randomly in polysiloxane molecules containing carboxyl groups.

In an embodiment of the present invention, polysiloxanes which have one or more carboxyl groups per molecule comprise in the range from 1 to 50, preferably from 2 to 25, particularly preferably on average from 2.5 to 15, carboxyl groups per molecule.

In an embodiment of the present invention, the molecular weight $M_w$ of polysiloxanes which have one or more carboxyl groups per molecule is in the range from 5000 g to 150 000 g/mol, preferably from 10 000 to 100 000 g/mol.

The molecular weight determination can be carried out by methods known to the person skilled in the art, for example by light scattering methods or viscosity determinations.

In an embodiment of the present invention, all or at least a certain proportion, for example a third or a half, of the carboxyl groups in the polysiloxanes which have one or more carboxyl groups per molecule are neutralized. For example basic salts, such as hydroxides or carbonates of alkali metals, such as, for example, Na or K, are suitable for the neutralization. Ammonia, alkylamines, such as, for example, methylamine, dimethylamine, trimethylamine, ethylamine, diethylamine, triethylamine, ethylenediamine, alkanolamines, such as, for example, ethanolamine, diethanolamine, triethanolamine, N-methylethanolamine, N-methyldiethanolamine or N-(n-butyl)-diethanolamine, are furthermore suitable for the neutralization.

Another type of suitable silicone compounds (B) comprises polysiloxanes which have no carboxyl groups. Such polysiloxanes, which are also referred to as polysiloxanes free of carboxyl groups in the context of the present invention, generally comprise structural elements of the above-designated formulae I, optionally III a, III b and IV a, the variables being defined as above. Polysiloxanes used according to the invention and free of carboxyl groups are preferably composed of structural elements of the above-designated formulae I, optionally III a, III b and IV a.

Particularly preferably used polysiloxanes which are free of carboxyl groups are poly(dimethyl)siloxanes and poly(phenylmethyl)siloxanes.

Polysiloxanes which are free of carboxyl groups and which comprise the structural elements of the general formulae I and optionally III a, III b and IV a may be linear or may have a cyclic or branched structure. Branched polysiloxanes which are free of carboxyl groups and which comprise the structural elements I and optionally III a and/or III b generally additionally comprise structural elements, for example, of the formula IV a. Cyclic straight-chain polysiloxanes which are free of carboxyl groups and which comprise the structural elements of the general formula I usually comprise no structural elements of the formulae III a and III b.

In a preferred embodiment of the present invention, all $R^1$ in polysiloxanes free of carboxyl groups are identical and are in each case methyl.

In another preferred embodiment, the structural elements I in polysiloxanes free of carboxyl groups are in each case identical, in I in each case one $R^1$ being methyl and the other $R^1$ being phenyl.

In an embodiment of the present invention, the structural elements of the formula III a in polysiloxanes free of carboxyl groups are selected from the following groups:

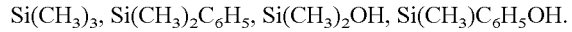
$Si(CH_3)_3$, $Si(CH_3)_2C_6H_5$, $Si(CH_3)_2OH$, $Si(CH_3)C_6H_5OH$.

Usually, the molecular weight $M_w$ of the polysiloxanes which are used according to the invention and which are free of carboxyl groups and have the structural elements I, II, optionally III a, III b and IV a is in the range from 500 g to 150 000 g/mol, preferably up to 10 000 g/mol.

In an embodiment of the present invention, formulations according to the invention comprise from 0.1 to 30% by weight, preferably from 0.5 to 15% by weight, of silicone compound (B), in particular at least 1% by weight.

In a special embodiment of the present invention, formulations according to the invention comprise from 1 to 20% by weight, preferably from 2 to 10% by weight, of polysiloxane which has one or more carboxyl groups per molecule.

Aqueous formulations according to the invention may comprise one or more emulsifiers (C), for example from 0.5 to 25% by weight, preferably from 1 to 10% by weight, of one or more emulsifiers (C), based on aqueous formulation according to the invention.

In principle, all compounds which are surface-active in aqueous systems and which may be nonionic, anionic, cationic or zwitterionic can be used as emulsifiers.

Particularly suitable emulsifiers are N-acylated amino acid derivatives, for example of the formula V

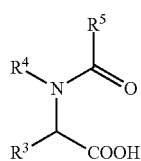

V in which the variables are defined as follows:
$R^3$ is hydrogen,
$C_1$-$C_4$-alkyl, such as methyl, ethyl, n-propyl, isopropyl, n-butyl, isobutyl, sec-butyl and tert-butyl, in particular methyl;
$C_6$-$C_{14}$-aryl for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;
$R^4$ is $C_1$-$C_4$-alkyl, such as methyl, ethyl, n-propyl, isopropyl, n-butyl, isobutyl, sec-butyl and tert-butyl; in particular methyl.

The group CO—$R^5$ is usually derived from saturated or unsaturated fatty acids. Saturated fatty acids are to be understood as meaning carboxylic acids having $C_9$-$C_{20}$-alkyl groups, which may be linear or branched, substituted or unsubstituted. $R^5$ may be, for example: n-nonyl, n-decyl, n-dodecyl, n-tetradecyl, n-pentadecyl, n-octadecyl or n-eicosyl.

CO—$R^5$ may be derived from an unsaturated fatty acid having 9 to 20 carbon atoms and one to 5 C—C double bonds, it being possible for the C—C double bonds to be, for example, isolated or allylic, for example the acyl radical of linoleic acid, of linolenic acid and very particularly preferably of oleic acid.

In an embodiment of the present invention, all or at least a certain proportion, for example a third or a half, of the carboxyl groups in N-acylated amino acid derivatives used as emulsifiers are neutralized. For example basic salts, such as hydroxides or carbonates of the alkali metals, such as, for example, Na or K, are suitable for the neutralization. Ammonia, alkylamines, such as, for example, methylamine, dimethylamine, trimethylamine, ethylamine, diethylamine, triethylamine, ethylenediamine and very particularly alkanolamines, such as, for example, ethanolamine, diethanolamine, triethanolamine, N-methylethanolamine, N-methyldiethanolamine or N-(n-butyl)diethanolamine, are furthermore suitable for the neutralization.

N-Oleylsarcosine, N-stearylsarcosine, N-lauroylsarcosine and N-isononanoylsarcosine and the respective sodium salts, ethanolammonium salts, diethanolammonium salts and N-methyldiethanolammonium salts may be mentioned as exemplary representatives for compounds of the formula V.

Further particularly suitable emulsifiers (C) are organic sulfites, in particular those of the general formula VI

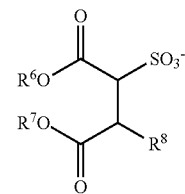

VI in which the variables are defined as follows:
$R^6$, $R^7$ are identical or preferably different and are selected from hydrogen,
$C_1$-$C_{30}$-alkyl, branched or straight-chain, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, n-undecyl, n-dodecyl, n-tridecyl, n-tetradecyl, n-hexadecyl, n-octadecyl, n-eicosyi, preferably radicals of the formula VI a which are branched in the β-position

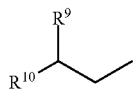

VIa (CH$_2$CH$_2$O)$_x$—O—R$^{11}$ or [CH(CH$_3$)CH$_2$O]$_x$—O—R$^{11}$,
where x is an integer in the range from 1 to 20, C$_6$-C$_{14}$-aryl, for example phenyl, 1-naphthyl, 2-naphthyl, 1-anthryl, 2-anthryl, 9-anthryl, 1-phenanthryl, 2-phenanthryl, 3-phenanthryl, 4-phenanthryl and 9-phenanthryl, preferably phenyl, 1-naphthyl and 2-naphthyl, particularly preferably phenyl;

R$^8$ is selected from C$_1$-C$_4$-alkyl, such as methyl, ethyl, n-propyl, isopropyl, n-butyl, isobutyl, sec-butyl, tert-butyl and in particular hydrogen;

R$^9$, R$^{10}$ are identical or preferably different and are selected from C$_1$-C$_{27}$-alkyl, such as methyl, ethyl, n-propyl, isopropyl, n-butyl, isobutyl, sec-butyl, tert-butyl, n-pentyl, isopentyl, sec-pentyl, neopentyl, 1,2-dimethylpropyl, isoamyl, n-hexyl, isohexyl, sec-hexyl, n-heptyl, isoheptyl, n-octyl, n-nonyl, n-decyl, n-undecyl, n-dodecyl, n-tridecyl, n-tetradecyl, n-hexadecyl, n-octadecyl, n-eicosyl;

the sum of the carbon atoms of R$^9$ and R$^{10}$ being not more than 30. Preferably, R$^9$ has two carbon atoms more than R$^{10}$; for example, the combinations R$^9$=n-undecyl and R$^{10}$=n-nonyl,
R$^9$=n-dodecyl and R$^{10}$=n-decyl,
R$^9$=n-tridecyl and R$^{10}$=n-undecyl,
R$^9$=n-tetradecyl and R$^{10}$=n-dodecyl,
R$^9$=n-pentadecyl and R$^{10}$=n-tridecyl are particularly preferred.

R$^{11}$ is selected from C$_1$-C$_4$-alkyl, such as methyl, ethyl, n-propyl, isopropyl, n-butyl, isobutyl, sec-butyl, tert-butyl, phenyl, ortho-tolyl, meta-tolyl, para-tolyl and in particular hydrogen.

In a preferred embodiment of the present invention, exactly one of the radicals R$^6$ and R$^7$ is hydrogen and the other radical is selected from C$_1$-C$_{30}$-alkyl.

In a particularly preferred embodiment of the present invention, a mixture of a plurality of compounds of the formula VI, which may, for example, differ in that R$^6$ is hydrogen and R$^7$ is selected from C$_1$-C$_{30}$-alkyl in the first compound of the formula VI and R$^7$ is hydrogen and R$^6$ is selected from C$_1$-C$_{30}$-alkyl in the second one, is chosen as emulsifier (C).

In an embodiment of the present invention, all or at least a certain proportion, for example a third or a half, of the sulfonyl groups in compounds of the general formula VI which are used as emulsifiers (C) are neutralized.

For example basic salts, such as hydroxides or carbonates of the alkali metals, such as, for example, Na or K, are suitable for the neutralization. Ammonia, alkylamines, such as, for example, methylamine, dimethylamine, trimethylamine, ethylamine, diethylamine, triethylamine, ethylenediamine, and very particularly alkanolamines, such as, for example, ethanolamine, diethanolamine, triethanolamine, N-methylethanolamine, N-methyldiethanolamine or N-(n-butyl)diethanolamine, are furthermore suitable for the neutralization.

The preparation of compounds of the formula VI is known per se and is described in WO 01/68584. It is effected, for example, by mono- or diesterification of dicarboxylic anhydrides of the general formula VII

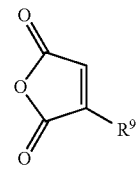

VII with corresponding alcohols which may not be present in pure form, followed by a reaction with disulfite.

Instead of a pure compound of the formula VI, it is possible to use mixtures of different sulfur-containing compounds as emulsifier. For example, it is possible to use the mixture known as oxo oil 135 or oxo thick oil 135 (WO 01/68584) for the esterification.

In an embodiment of the present invention, formulations used in the process according to the invention may comprise up to 40% by weight, preferably up to 20% by weight, based on the formulation, of at least one alcohol of the formula VIII

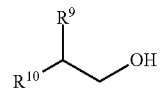

VIII the variables R$^9$ and R$^{10}$ being defined as above in formula VIII.

In an embodiment of the present invention, formulations used in the process according to the invention may comprise up to 50% by weight, preferably up to 30% by weight, based on the formulation, of at least one compound of the formula VIII.

In a preferred embodiment of the present invention, formulations used in the process according to the invention may comprise up to 40% by weight, particularly preferably up to 20% by weight, of mixtures which comprise at least one alcohol of the general formula VIII; oxo oil 135 and oxo oil 13 may be mentioned by way of example for such mixtures.

Further particularly suitable emulsifiers (C) are phosphates of alkoxylated and in particular ethoxylated alkanols (alkyl radical C$_{12}$-C$_{30}$, preferably C$_{16}$-C$_{20}$, degree of alkoxylation, preferably degree of ethoxylation, from 2 to 10, preferably from 3 to 5) and phosphates of alkoxylated and in particular ethoxylated alkenols (alkenyl radical C$_{12}$-C$_{30}$, preferably C$_{14}$-C$_{20}$, having one to three C—C double bonds, degree of alkoxylation, preferably degree of ethoxylation, from 2 to 10, preferably from 3 to 5). Phosphates of alkoxylated and in particular ethoxylated alkanols or alkenols may be partly or completely neutralized, for example with a basic alkali metal compound, in particular with potassium hydroxide or sodium hydroxide.

Preferred examples of C$_{12}$-C$_{30}$-alkyl are n-C$_{12}$-C$_{30}$-alkyl, in particular lauryl (n-C$_{12}$H$_{25}$), myristyl (n-C$_{14}$H$_{29}$), palmityl (n-C$_{16}$H$_{33}$) and stearyl (n-C$_{18}$H$_{37}$). Preferred examples of C$_{12}$-C$_{30}$-alkenyl are cis-octadec-9-enyl, cis,cis-octadeca-9,12-dienyl and all-cis-octadeca-9,12,15-trienyl.

In an embodiment of the present invention, aqueous formulation according to the invention comprises at least one further hydrophobic compound (D). At least one hydrophobic compound (D) is a carbon-based compound, for example natural or preferably synthetic wax, natural or preferably synthetic oil or natural or preferably synthetic fat.

Beeswax, cork wax, montan waxes or carnauba wax may be mentioned as examples of natural waxes.

Polyethylene waxes or ethylene copolymer waxes, as obtainable, for example, by free radical polymerization of ethylene or free radical copolymerization of ethylene with, for example, (meth)acrylic acid or by Ziegler-Natta catalysis, may be mentioned as examples of synthetic waxes. Furthermore, polisobutylene waxes may be mentioned. Furthermore, paraffin mixtures may be mentioned: these are to be understood as meaning mixtures of hydrocarbons which have 12 or more carbon atoms and usually have a melting point in the range from 25 to 45° C. Such paraffin mixtures may occur, for example, in refineries or crackers and are known to the person skilled in the art as slack wax and sasol waxes. Montan ester waxes are a further example of synthetic waxes.

Triglycerides which are liquid at room temperature, for example fish oil, neatsfoot oil, olive oil, cottonseed oil, castor oil, sunflower oil and peanut oil, may be mentioned as examples of natural oils.

White oil, liquid paraffin, functionalized paraffins, such as, for example, chlorinated or sulfochlorinated paraffins, or polyalkylene glycols, such as, for example, polyethylene glycol, may be mentioned as examples of synthetic oils.

Natural triglycerides which are solid at room temperature, such as, for example, lanolin, shellac wax and mixtures thereof, may be mentioned as examples of natural fats.

According to the invention, about 10 to 70, preferably from 20 to 40, % by weight of one or more further hydrophobic compound(s) (D), based on the formulation, may be used.

In one embodiment of the present invention, aqueous formulation according to the invention comprises in the range from 1 to 80% by weight, preferably from 5 to 60% by weight, of copolymer (A), in the range from 0.1 to 30% by weight, preferably from 0.5 to 15% by weight, of silicone compound (B), in particular at least 1% by weight, in the range from 0.5 to 25% by weight, preferably from 1 to 10% by weight, of emulsifier (C), in the range from a total of 10 to 70, preferably from 20 to 40, % by weight of further hydrophobic compound(s) (D), data in % by weight being based in each case on total aqueous formulation according to the invention.

Aqueous formulations according to the invention are particularly suitable for the production of leather. Leather produced with the aid of aqueous formulations according to the invention is distinguished by overall advantageous performance characteristics, in particular a particularly low tendency to form diffusion-related inhomogeneities in the fat distribution. The dyeing of leathers according to the invention is particularly uniform. Furthermore, they show no measurable trend toward loose-grain character or double-skin character.

The present invention furthermore relates to a process for the preparation of the aqueous formulations according to the invention, also referred to below as preparation process according to the invention. The preparation process according to the invention can be carried out in general in a manner such that the components copolymer (A), silicone compound (B), if appropriate emulsifier(s) (C) and, if appropriate, further hydrophobic compound(s) (D) and, if appropriate, alcohol of the formula VIII are mixed with one another. The sequence of addition of the individual components is generally not critical. The mixing can be effected, for example, by simple stirring of the components, for example using a mixter or a Ultra-Turrax stirrer. In some cases, further homogenization is effected, for example using a gap homogenizer. Formulations according to the invention which have a particularly long shelf-life are obtained if at least one further homogenization is carried out.

The present invention furthermore relates to the use of copolymers according to the invention for the preparation of aqueous formulations, selected from emulsions or dispersions, of silicone compounds (B). The present invention furthermore relates to a process for the preparation of aqueous formulations, selected from emulsions or dispersions, of silicone compounds (B) with the use of copolymers according to the invention.

Formulations according to the invention may comprise an emulsifier. Examples of suitable emulsifiers are mentioned above.

In one variant of the present invention, up to a maximum of 2% by weight of further emulsifier, based on total aqueous emulsion or dispersion, are used for carrying out the above-mentioned process according to the invention. In another variant, no emulsifier is used.

The present invention furthermore relates to aqueous formulations selected from emulsions and dispersions, comprising at least one copolymer according to the invention and (B) at least one silicone compound.

Copolymer according to the invention can therefore be used as an emulsifier (compatibilizer) for a very wide range of lipophilic substances, in particular for silicone compounds (B).

Silicone compound (B) may carry carboxyl groups. In another variant, silicone compound (B) carries no carboxyl groups:

In one embodiment of the present invention, silicone compound (B) is a silicone which is liquid at room temperature.

The aqueous formulations according to the invention, in particular dispersions or emulsions, can advantageously be used for the production of fibrous substrates, as release agents, as cleaning agents, as lubricants, for the machining or processing of construction materials or in cosmetic preparations. The present invention furthermore relates to the use of aqueous formulations according to the invention, selected from emulsions and dispersions, for the production of fibrous substrates, as release agents, as cleaning agents, as lubricants, for the machining or processing of construction materials or in cosmetic preparations.

In one embodiment of the present invention, fibrous substrates are selected from leather, paper, wood, textile and board.

The present invention furthermore relates to a method for reducing the friction between movable parts with the use of formulations according to the invention, selected from dispersions or emulsions.

Further subject matter comprises leather, cosmetic preparations or construction materials, produced with the use of aqueous formulations according to the invention, in particular dispersions or emulsions.

The present invention furthermore relates to detergents or cleaning agents, produced with the use of aqueous formulations according to the invention or with the use of a copolymer according to the invention.

If it is desired to use aqueous formulations according to the invention, selected from emulsions and dispersions, as cleaning agents or for the cleaning of surfaces, it is possible to start from any desired surfaces, for example leather, plastic, or vulcanized or unvulcanized rubber. For example, it is possible to adopt a procedure in which aqueous formulations according to the invention, selected from emulsions and dispersions, are applied, for example with cleaning means, such as, for example, wadding, a sponge, paper cloth, rags or cloth, or by means of a spray apparatus, for example a spray can, and then allowed to act, for example in the range of from 10 seconds to one day, and then supernatant emulsion or dispersion according to the invention is removed, for example with a cleaning means, such as, for example, wadding, a sponge, paper cloth, rags or cloth. Glossy, clean surfaces are obtained.

If it is desired to use aqueous formulations according to the invention selected from emulsions and dispersions, for machining or processing construction materials, the hydrophobization of gypsum, stone, clinker and concrete is preferred. For this purpose, dispersion or emulsion according to the invention is either introduced into concrete raw material or applied subsequently to the relevant construction material, for example by spreading, spraying or impregnating, and is then left to dry.

The present invention furthermore relates to construction materials, produced with the use of at least one aqueous formulation according to the invention, selected from emulsions and dispersions.

If it is desired to use an aqueous formulation according to the invention, selected from emulsions and dispersions, as or in cosmetic preparations, ointments, creams, soaps, lotions, shampoos and hair setting compositions, and wash, shower and bath preparations are preferred. The present invention furthermore relates to cosmetic preparations, prepared with the use of at least one aqueous formulation according to the invention, selected from emulsions and dispersions. Cosmetic preparations according to the invention comprise an emulsion or dispersion according to the invention.

Cosmetic preparations according to the invention may comprise an oil or fat phase (E) in addition to water and dispersion or emulsion according to the invention. The oil or fat phase (E) may be formed, for example, by one or more natural or synthetic oils, fats or waxes.

In one embodiment of the present invention, the oil or fat phase (E) is composed of one constituent or preferably a plurality of constituents, which are mentioned below.

Constituents of the oil and/or fat phase (E) can be selected, for example, from the group consisting of the lecithins and of the fatty acid triglycerides, for example of the triglyceryl esters of saturated and/or unsaturated, branched and/or straight-chain alkanecarboxylic acids having a chain length of from 8 to 24, in particular from 12 to 18, carbon atoms. Fatty acid triglycerides can advantageously be selected, for example, from the group consisting of the synthetic, semisynthetic and natural oils, such as, for example, olive oil, sunflower oil, soybean oil, peanut oil, rapeseed oil, almond oil, palm oil, coconut oil, castor oil, wheatgerm oil, grapeseed oil, safflower oil, evening primrose oil and macadamia nut oil.

Further constituents of the oil and/or fat phase (E) can be selected from the group consisting of the esters of saturated and/or unsaturated, branched and/or straight-chain alkanecarboxylic acids having a chain length of 3 to 30 carbon atoms and saturated and/or unsaturated, branched and/or straight-chain alcohols having a chain length of 3 to 30 carbon atoms and from the group consisting of the esters of aromatic carboxylic acids and saturated and/or unsaturated, branched and/or straight-chain alcohols having a chain length of 3 to 30 carbon atoms. Preferred examples are isopropyl myristate, isopropyl palmitate, isopropyl stearate, isopropyl oleate, n-butyl stearate, n-hexyl laurate, n-decyl oleate, isooctyl stearate, isononyl stearate, isononyl isononanoate, 2-ethylhexyl palmitate, 2-ethylhexyl laurate, 2-hexyldecyl stearate, 2-octyldodecyl palmitate, oleyl oleate, oleyl erucate, erucyl oleate, erucyl erucate, dicaprylyl carbonate (Cetiol CC) and cocoglycerides (for example Myritol 331), butylene glycol dicaprylate/dicaprate and di-n-butyl adipate and synthetic, semisynthetic and natural mixtures of such esters, such as, for example jojoba oil.

Further constituents of the oil or fat phase (E) can be selected from the group consisting of the branched and straight-chain hydrocarbons and hydrocarbon waxes, the di-$C_5$-$C_{20}$-alkyl ethers, and from the group consisting of the saturated or unsaturated, branched or straight-chain $C_{12}$-$C_{30}$-alcohols, which may also perform the function of a foam former.

Any desired mixtures of the abovementioned constituents may also be used as oil or fat phase (E) in cosmetic preparations according to the invention.

It may be advantageous to use waxes, for example cetyl palmitate, as the sole lipid component of the oil or fat phase (E).

Preferred constituents of the oil or fat phase (E) are selected from the group consisting of 2-ethylhexyl isostearate, octyldodecanol, isotridecyl isononanoate, isoeicosane, 2-ethylhexyl cocoate, $C_{12}$-$C_{15}$-alkyl benzoate, caprylic/capric acid triglyceride, dicaprylyl ether.

Examples of preferred mixtures of constituents of the oil or fat phase (E) are selected from mixtures of $C_{12}$-$C_{15}$-alkyl benzoate and 2-ethylhexyl isostearate, mixtures of $C_{12}$-$C_{15}$-alkyl benzoate and isotridecyl isononanoate and mixtures of $C_{12}$-$C_{15}$-alkyl benzoate, 2-ethylhexyl isostearate and/or isotridecyl isononanoate.

Fatty acid triglycerides, in particular soybean oil and/or almond oil, are particularly preferably used according to the invention as oils having a polarity of from 5 to 50 mN/m.

From the group consisting of the hydrocarbons, it is possible to use, for example, liquid paraffin, squalane, squalene and in particular optionally hydrogenated polyisobutenes as oil or fat phase (E).

In one embodiment of the present invention, the oil or fat phase (E) can be selected from Guerbet alcohols. Guerbet alcohols are known as such and are obtainable, for example, by heating two equivalents of alcohol of the general formula $R^{12}$—$CH_2$—$CH_2$—OH in the presence of, for example, Na and/or Cu to give alcohols of the formula $R^{12}$—$CH_2$—$CH_2$—$CHR^{12}$—$CH_2$—OH. Here, $R^{12}$ is $C_2$-$C_{20}$-alkyl, branched or preferably straight-chain, in particular straight-chain $C_3$-$C_{14}$-alkyl, for example in each case straight-chain propyl, butyl, pentyl, hexyl, heptyl, octyl, nonyl, decyl, undecyl, dodecyl, tridecyl or tetradecyl. Guerbet alcohols which are particularly preferably suitable as oil or fat phase (E) are 2-n-butyloctanol ($R^{12}$=n-$C_4H_9$) and 2-n-hexyldecanol ($R^{12}$=n-$C_6H_{13}$) and mixtures of the abovementioned Guerbet alcohols.

Cosmetic preparations according to the invention may furthermore comprise one or more fragrances or aromas (F).

Suitable fragrances or aromas (F) may pure substances or mixtures of natural or synthetic volatile compounds which produce an odor. Natural fragrances are extracts of flowers (lily, lavender, rose, jasmine, neroli, ylang-ylang), stalks and leaves (geranium patchouli, petitgrain), fruits (aniseed, coriander, caraway, juniper), fruit peels (bergamot, lemon, orange), roots (mace, angelica, celery, cardamom, costus, iris, calmus), woods (pinewood, sandalwood, guaiac wood, cedar wood, rosewood), herbs and grasses (tarragon, lemongrass, sage, thyme), needles and branches (spruce, fir, pine, dwarf pine), resins and balsams (galbanum, elemi, benzoin, myrrh, olibanum, opoponax). Animal raw materials, such as, for example, civet and castoreum are furthermore suitable. Typical synthetic fragrances are products of the ester, ether, aldehyde, ketone, alcohol and hydrocarbon type. Fragrances of the ester type are, for example, benzyl acetate, phenoxy ethyl isobutyrate, 4-tert-butylcyclohexyl acetate, linalyl acetate, dimethylbenzylcarbinyl acetate, phenylethyl acetate, linalyl benzoate, benzyl formate, ethylmethylphenyl glycinate, allylcyclohexyl propionate, styrallyl propionate and benzyl salicylate. The fragrances of the ether type include, for example, benzyl ethyl ether, the fragrances of the aldehyde type include, for example, linear alkanals having 8 to 18 carbon atoms, citral, citronellal, citronellyloxyacetaldehyde, cyclamenaldehyde, hydroxycitronellal, lilial, and bourgeonate, the fragrances of the ketone type include, for example, ionones, cc-isomethylionene and methylcedryl ketone, the fragrances of the alcohol type include anethole, citronellol, eugenol, isoeugenol, geraniol, linalool, benzyl alcohol, phenylethyl alcohol and terioneol, the fragrances of the hydrocarbon type include mainly the terpenes and balsams. However, mixtures of different fragrances which together produce an appealing fragrance note are preferably used. Essential oils of lower volatility, which are generally used as aroma components, are also suitable as fragrances, e.g. sage oil, chamomile oil, oil of cloves, melissa oil, mint oil, cinnamon leaf oil, linden blossom oil, juniper berry oil, vetiver oil, olibanum oil, galbanum oil, labolanum oil and lavandin oil. Bergamot oil, dihydromyrcenol, lilial, lyral, citronellol, phenylethyl alcohol, α-hexylcinnamaldehyde, α-amylcinnamaldehyde, geraniol, benzylacetone, cyclamenaldehyde, linalool, Boisambrene®Forte, ambroxan, indole, hedione, sandelice, citrus oil, mandarin oil, orange oil, allylamyl glycolate, cyclovertal, lavandin oil, muscatel sage oil, β-damascone, geranium oil bourbon, cyclohexyl salicylate, evernyl, iraldein gamma, phenyl acetic acid, geranyl acetate, benzyl acetate, rose oxide, romillate, irotyl and floramate are preferably used alone or in mixtures.

Cosmetic preparations according to the invention may furthermore comprise one or more additives (G). Additives (G) can be selected from conditioners, antioxidants, ethoxylated glyceryl mono- or di-fatty acid esters, thickeners, foam formers, wetting agents and humectants, biocides, organic solvents, such as, for example ethanol or isopropanol, glitter and/or other effect substances (e.g. color streaks) and abrasives. Glitter and other effect substances (e.g. color streaks) are substantially of aesthetic importance.

Examples of conditioners are mentioned in the International Cosmetic Ingredient Dictionary and Handbook (Volume 4, Editors: R. C. Pepe, J. A. Wenninger, G. N. McEwen, The Cosmetic, Toiletry and Fragrance Association, 9th edition, 2002) under Section 4 under the keywords Hair Conditioning Agents, Humectants, Skin-Conditioning Agents, Skin-Conditioning Agents-Emollient, Skin-Conditioning Agents-Humectant, Skin-Conditioning Agents-Miscellaneous, Skin-Conditioning Agents-Occlusive and Skin Protectants. Further examples of conditioners are compounds mentioned in EP-A 0 934 956 (pages 11 to 13) under "water soluble conditioning agent" and "oil soluble conditioning agent". Further advantageous conditioners are, for example, the compounds designated as polyquaternium according to INCI (in particular polyquaternium-1 to polyquaternium-56). A very particularly preferred conditioner is N,N-dimethyl-N-2-propenyl-2-propenaminium chloride (polyquaternium-7).

Further examples of advantageous conditioners are cellulose derivatives and quaternized guar gum derivatives, in particular guar hydroxypropylammonium chloride (e.g. Jaguar Excel®, Jaguar C 162® (Rhodia), CAS 65497-29-2, CAS 39421-75-5). Nonionic poly-N-vinylpyrrolidone/polyvinyl acetate copolymers (e.g. Luviskol®VA 64 (BASF)), anionic acrylate copolymers (e.g. Luviflex®Soft (BASF)) and/or amphoteric amide/acrylate/methacrylate copolymers (e.g. Amphomer® (National Starch)) can also be advantageously used according to the invention as conditioners. Further examples of advantageous conditioners are quaternized silicones.

Examples of ethoxylated glyceryl mono- or di-fatty acid esters are PEG-10 olive oil glycerides, PEG-11 avocado oil glycerides, PEG-11 cocoa butter glycerides, PEG-13 sunflower oil glycerides, PEG-15 glyceryl isostearate, PEG-9 coconut fatty acid glycerides, PEG-54 hydrogenated castor oil, PEG-7 hydrogenated castor oil, PEG-60 hydrogenated castor oil, jojoba oil ethoxylate (PEG-26 jojoba fatty acids, PEG-26 jojoba alcohol), glycereth-5 cocoate, PEG-9 coconut fatty acid glycerides, PEG-7 glyceryl cocoate, PEG-45 palm kernel oil glycerides, PEG-35 castor oil, olive oil PEG-7 ester, PEG-6 caprylic acid/capric acid glycerides, PEG-10 olive oil glycerides, PEG-13 sunflower oil glycerides, PEG-7 hydrogenated castor oil, hydrogenated palm kernel oil glyceride PEG-6 ester, PEG-20 corn oil glycerides, PEG-18 glyceryl oleate cocoate, PEG-40 hydrogenated castor oil, PEG-40 castor oil, PEG-60 hydrogenated castor oil, PEG-60 corn oil glycerides, PEG-54 hydrogenated castor oil, PEG-45 palm kernel oil glycerides, PEG-80 glyceryl cocoate, PEG-60 almond oil glycerides, PEG-60 "evening primrose" glycerides, PEG-200 hydrogenated glyceryl palmate, PEG-90 glyceryl isostearate. In the context of the present invention, PEG is polyethylene glycol and the number following PEG is the number average of the ethylene glycol units of the relevant polyethylene glycol.

Preferred ethoxylated glyceryl mono- or di-fatty acid esters are PEG-7 glyceryl cocoate, PEG-9 cocoglycerides, PEG-40 hydrogenated castor oil, PEG-200 hydrogenated glyceryl palmate.

Ethoxylated glyceryl mono- or di-fatty acid esters can be used for different purposes in cosmetic preparations according to the invention. Ethoxylated glyceryl mono- or di-fatty acid esters having 3 to 12 ethylene oxide units per molecule serve as refatting agents for improving the feel of the skin after drying, and ethoxylated glyceryl mono- or di-fatty acid esters having 30 to 50 ethylene oxide units per molecule serve as solubilizers for nonpolar substances, such as fragrances. Ethoxylated glyceryl mono- or di-fatty acid esters having more than 50 ethylene oxide units per molecule are used as thickeners. Examples of suitable antioxidants are all antioxidants suitable or customary for cosmetic and/or dermatological applications.

Antioxidants are preferably selected from the group consisting of the amino acids (e.g. glycine, histidine, tyrosine, tryptophan), imidazoles (e.g. urocanic acid), peptides, such as D,L-carnosine, D-carnosine, L-carnosine and derivatives thereof (e.g. anserine), carotinoids, carotenes (e.g. α-carotene, β-carotene, γ-lycopene), chlorogenic acid and derivatives thereof, liponic acid and derivatives thereof (e.g. dihydroliponic acid), aurothioglucose, propylthiouracil and other thiols (e.g. thioredoxin, glutathione, cysteine, cystine, cystamine and the glycosyl, N-acetyl, methyl, ethyl, propyl, amyl, butyl and lauryl, palmitoyl, oleyl, γ-linoleyl, cholesteryl and glyceryl esters thereof) and salts thereof, dilauryl thiodipropionate, distearyl thiodipropionate, thiodipropionic acid and derivatives thereof (esters, ethers, peptides, lipids, nucleotides, nucleosides and salts) and sulfoximine compounds (e.g. buthionine sulfoximines, homocysteine sulfoximine, buthionine sulfones, penta-, hexa- and heptathionine sulfoximine) in very small doses (e.g. pmol to μmol/kg of mixture according to the invention), furthermore (metal) chelators (e.g. α-hydroxy fatty acids, palmitic acid, phytic acid, lactoferrin), α-hydroxy acids (e.g. citric acid, lactic acid, malic acid), humic acid, bile acid, bile extracts, bilirubin, biliverdin, EDTA, EGTA, unsaturated fatty acids (e.g. γ-linolenic acid, linoleic acid, oleic acid), folic acid, furfurylidene sorbitol, ubiquinone and ubiquinol, vitamin C and derivatives (e.g. ascorbyl palmitate, magnesium ascorbyl phosphate, ascorbyl acetate), tocopherols and derivatives (e.g. vitamin E acetate), vitamin A and derivatives (vitamin A palmitate) and coniferyl benzoate from benzoin resin, rutinic acid and derivatives thereof, α-glycosylrutin, ferulaic acid, furfurylidene glucitol, carnosine, butylhydroxytoluene, butylhydroxyanisole, nordihydroguaiac resin acid, nordihydroguaiaretic acid, trihydroxybutyrophenone, uric acid and derivatives thereof, mannose and derivatives thereof, zinc and derivatives thereof (e.g. ZnO, $ZnSO_4$), selenium and derivatives thereof (e.g. selenium methionine), stilbenes and derivatives thereof (e.g. stilbene oxide, in particular trans-stilbene oxide) and suitable derivatives (salts, esters, ethers, sugars, nucleotides, nucleosides, peptides and lipids).

Suitable thickeners for cosmetic preparations according to the invention are crosslinked polyacrylic acids and derivatives thereof, carrageenan, xanthan, polysaccharides, such as xanthan gum, guar guar, agar agar, alginates or tyloses, cellulose derivatives, e.g. carboxymethylcellulose, hydroxycarboxymethylcellulose, hydroxyethylpropylcellulose, hydroxybutylmethylcellulose, hydroxypropylmethylcellulose, furthermore relatively high molecular weight polyethylene glycol mono- and diesters of fatty acids, fatty alcohols, monoglycerides and fatty acids, polyvinyl alcohol and polyvinylpyrrolidone. Further suitable thickeners are phyllosilicates.

Suitable thickeners are furthermore, for example, hydrophilic pyrogenic silica gels, polyacrylamides, polyvinyl alcohol and polyvinylpyrrolidone, esters of fatty acids with polyols, such as, for example, pentaerythritol or trimethylolpropane, fatty alcohol ethoxylates having a narrow homolog distribution or $C_1$-$C_{20}$-alkyloligoglucosides and electrolytes, such as sodium chloride and ammonium chloride.

Biocides suitable for cosmetic preparations according to the invention are compositions having specific action against gram-positive bacteria, e.g. triclosan (2,4,4'-trichloro-2'-hydroxydiphenyl ether), chlorhexidine (1,1'-hexamethylenebis[5-(4-chlorophenyl)-biguanide) and TTC (3,4,4'-trichlorocarbanilide). Very suitable biocides are furthermore isothioxalones, such as, for example, 5-chloro-2-methyl-3(2H)isothiazolone and 2-methyl-3(2H)isothiazoione. Quaternary ammonium compounds are in principle also suitable and are preferably used for disinfecting soaps and wash lotions. Numerous fragrances also have biocidal properties. A large number of essential oils or the characteristic ingredients thereof, such as, for example, oil of cloves (eugenol), mint oil (menthol) or thyme oil (thymol), also have pronounced antimicrobial activity. Further suitable biocides are fluorine compounds, which are suitable, for example, for prevention of caries, such as, for example, NaF, amine fluorides.

Examples of foam formers may be, for example, sulfo-containing surfactants, in particular sodium lauryl sulfate.

Examples of humectants are sorbitol, glycerol, polyethylene glycol, for example having a molecular weight $M_n$ in the range from 200 to 1000 g/mol.

Cosmetic preparations according to the invention may furthermore comprise colorants, for example dyes or pigments, glitter and/or other effect substances (e.g. color streaks).

Cosmetic preparations according to the invention can, for example, comprise one or more abrasives, for example polyethylene glycol, silica gel or calcium carbonate.

Cosmetic preparations according to the invention can be prepared, for example, by mixing a dispersion or emulsion according to the invention comprising one or more of the abovementioned substances oil or fat phase (E), fragrances and aromas (F) and additives (G), if appropriate, with water.

If it is desired to use dispersions or emulsions according to the invention as release agents or in processes for separation of articles, this can be effected, for example, for the production of peelable films or stickers, or in injection molding machines for simplified demolding of injection molded parts. For example, a film-like material, for example a polymer film comprising polyester, polyethylene, polypropylene or polyurethane, can be brought into contact on one or two sides with dispersion or emulsion according to the invention and then dried, for example in the air. Preferably, dispersion or emulsion according to the invention is mixed with a further material, for example colloidal silica, and then brought into contact with film-like material.

The present invention furthermore relates to mixtures, also referred to as mixtures according to the invention for short, comprising at least one hydrophilic substance, at least one hydrophobic substance and at least one copolymer according to the invention. Mixtures according to the invention may comprise water. In a specific embodiment of the present invention, mixtures according to the invention comprise no water. Examples of hydrophilic substances are alcohols, in particular $C_1$-$C_4$-alkanols, polyols, glycerol, polyvinyl alcohol and polyacrylates. Examples of hydrophobic substances are hydrophobic compounds (D).

In one embodiment of the present invention, mixtures according to the invention comprise
   in the range of from 0.5 to 95% by weight of hydrophilic substance,
   in the range of from 0.5 to 95% by weight of hydrophobic substance,
   in the range of from 0.4 to 40% by weight of copolymer according to the invention.

The present invention furthermore relates to the use of copolymer (A) and in particular of copolymer according to the invention as a component of water-based coatings and coating materials and adhesives, in machining and metal processing, for example in cutting, and as a flotation compound in mineral and ore extraction and as a flotation compound in mineral and ore processing.

The invention is explained by working examples.

I. Preparation of Copolymers (A) According to the Invention

I.1 Preparation of Copolymer (A.1) According to the Invention

The following solutions and emulsions were prepared:
Solution I.1.1:
   44 g of acrylic acid (a.1) in 102.6 g of distilled water
Emulsion I.1.2:
   42.2 g of acrylic acid (a.1), 66.8 g of tert-butyl methacrylate (b.1), 258.6 g of 2-ethylhexyl acrylate (c.1) and 12.3 g of n-dodecyl mercaptan were emulsified with the aid of
   15.2 g of a 15% by weight aqueous solution of sodium laurylsulfate and
   30.5 g of a 32% by weight aqueous solution of the sodium salt of a sulfuric acid monoester of $C_{16}$-ethoxylates (on average 30 mol of ethylene oxide/mole) in 225.1 ml of distilled water.
Solution I.1.3:
   8.2 g of $Na_2S_2O_8$ were dissolved in 109.4 ml of distilled water.

195.6 ml of distilled water and 6.5 g of a 15% by weight aqueous solution of sodium laurylsulfate were initially taken in a 2 liter stirred vessel having a plurality of feeds, a reflux condenser and a gas inlet tube. Thereafter, nitrogen was allowed to bubble through the initially taken mixture for 15 minutes and heating to 80° C. was effected with stirring.

Thereafter, the addition of solution I.1.3 was begun and said solution was added dropwise in the course of 4.5 hours. About 3 minutes after the beginning of the addition of solution I.1.3, the addition of solution I.1.1 was begun, which solution was metered in in the course of 60 minutes. Thereafter, the addition of emulsion I.1.2 was begun. Emulsion I.1.2 was added in the course of 3 hours, stirring being continued. Stirring was continued for a further 90 minutes at 80° C. and the mixture was then allowed to cool to 50° C. and 47.9 g of a 50% by weight aqueous sodium hydroxide solution were then added in the course of 30 minutes. Cooling to room temperature was then effected. An aqueous dispersion according to the invention having a solids content of 40% was obtained. Copolymer (A.1) according to the invention had an average molecular weight $M_w$ of 10 400 g/mol.

I.2 Preparation of Copolymer (A.2) According to the Invention

The following solutions and emulsions were prepared:
Solution I.2.1:
30.9 g of acrylic acid (a.1) in 72.1 g of distilled water
Emulsion I.2.2:
29.7 g of acrylic acid (a.1), 103.4 g of cyclohexyl methacrylate (b.2), 327.9 g of 2-ethylhexyl acrylate (c.1) and 14.8 g of n-dodecyl mercaptan were emulsified with the aid of
20.1 g of a 15% by weight aqueous solution of sodium laurylsulfate and
40.4 g of a 32% by weight aqueous solution of the sodium salt of a sulfuric acid monoester of $C_{16}$-ethoxylates (on average 30 mol of ethylene oxide/mole) in 237 ml of distilled water.
Solution I.2.3:
9.8 g of $Na_2S_2O_8$ were dissolved in 130.7 ml of distilled water.
134 ml of distilled water and 8.6 g of a 15% by weight aqueous solution of sodium laurylsulfate were initially taken in a 2 liter stirred vessel having a plurality of feeds, a reflux condenser and a gas inlet tube. Thereafter, nitrogen was allowed to bubble through the initially taken mixture for 15 minutes and heating to 80° C. was effected with stirring.

Thereafter, the addition of solution I.2.3 was begun and said solution was added dropwise in the course of 4.5 hours. About 3 minutes after the beginning of the addition of solution I.2.3, the addition of I.2.1 was begun, which solution was metered in the course of 60 minutes. Thereafter, the addition of emulsion I.2.2 was begun. Emulsion I.2.2 was added in the course of 3 hours, stirring being continued. Stirring was effected for a further 90 minutes at 80° C. and then cooling to 50° C. was effected and thereafter 84.1 g of a 20% by weight aqueous sodium hydroxide solution were added in the course of 30 minutes. Cooling to room temperature was then effected. An aqueous dispersion according to the invention having a solids content of 43.4% and a pH of 5.1 was obtained. Copolymer (A.2) according to the invention had an average molecular weight $M_w$ of 9200 g/mol.

I.3 Preparation of Copolymer (A.3) According to the Invention

The following solutions and emulsions were prepared:
Solution I.3.1:
44 g of acrylic acid (a.1) in 102.6 g of distilled water
Emulsion I.3.2:
42.2 g of acrylic acid (a.1), 66.2 g of sec-butyl acrylate (2-methylpropyl acrylate) (b.3),
258.6 g of 2-ethylhexyl acrylate (c.1) and 12.1 g of n-dodecyl mercaptan were emulsified with the aid of 14.9 g of a 15% by weight aqueous solution of sodium laurylsulfate and
29.9 g of a 32% by weight aqueous solution of the sodium salt of a sulfuric acid monoester of $C_{16}$-ethoxylates (on average 30 mol of ethylene oxide/mole) in 225.4 ml of distilled water.
Solution I.3.3:
8.1 g of $Na_2S_2O_8$ were dissolved in 107.6 ml of distilled water.
195.6 ml of distilled water and 6.4 g of a 15% by weight aqueous solution of sodium laurylsulfate were initially taken in a 2 liter stirred vessel having a plurality of feeds, a reflux condenser and a gas inlet tube. Thereafter, nitrogen was allowed to bubble through the initially taken mixture for 15 minutes and heating to 80° C. was effected with stirring.

Thereafter, the addition of solution I.3.3 was begun and said solution was added dropwise in the course of 4.5 hours. About 3 minutes after the beginning of the addition of solution I.3.3, the addition of solution I.3.1 was begun, which solution was metered in in the course of 60 minutes. Thereafter, the addition of emulsion I.3.2 was begun. Emulsion I.3.2 was added in the course of 3 hours, stirring being continued. Stirring was effected for a further 90 minutes at 80° C. and then cooling to 50° C. was effected and thereafter 47.9 g of a 50% by weight aqueous sodium hydroxide solution were added in the course of 30 minutes. Cooling to room temperature was then effected. An aqueous dispersion according to the invention having a solids content of 40.7% and a pH of 4.9 was obtained. Copolymer (A.3) according to the invention had an average molecular weight $M_w$ of 9100 g/mol.

I.4 Preparation of Copolymer (A.4)

The following solutions and emulsions were prepared:
Solution I.4.1:
30.9 g of acrylic acid (a.1) in 134 g of distilled water
Emulsion I.4.2:
29.7 g of acrylic acid (a.1), 78.8 g of tert-butyl acrylate (b.4), 327.9 g of 2-ethylhexyl acrylate (c.1) and 14 g of n-dodecyl mercaptan were emulsified with the aid of 19 g of a 15% by weight aqueous solution of sodium laurylsulfate and 38.1 g of a 32% by weight aqueous solution of the sodium salt of a sulfuric acid monoester of $C_{16}$-ethoxylates (on average 30 mol of ethylene oxide/mole) in 227.4 ml of distilled water.
Solution I.4.3:
9.3 g of $Na_2S_2O_8$ were dissolved in 124.2 ml of distilled water.
134.4 ml of distilled water and 8.1 g of a 15% by weight aqueous solution of sodium laurylsulfate were initially taken in a 2 liter stirred vessel having a plurality of feeds, a reflux condenser and a gas inlet tube. Thereafter, nitrogen was allowed to bubble through the initially taken mixture for 15 minutes and heating to 80° C. was effected with stirring.

Thereafter, the addition of solution I.4.3 was begun and said solution was added dropwise in the course of 4.5 hours. About 3 minutes after the beginning of the addition of solution I.4.3, the addition of solution I.4.1 was begun, which solution was metered in in the course of 60 minutes. Thereafter, the addition of emulsion I.4.2 was begun. Emulsion I.4.2 was added in the course of 3 hours, stirring being continued. Stirring was effected for a further 90 minutes at 80° C. and then cooling to 30° C. was effected and thereafter 84.1 g of a 20% by weight aqueous sodium hydroxide solution were added in the course of 30 minutes. Cooling to room temperature was then effected. An aqueous dispersion according to the invention having a solids content of 42.8% and a pH of 5.1 was obtained. Copolymer (A.4) had an average molecular weight $M_w$ of 9100 g/mol.

I.5 Preparation of Copolymer (A.5) According to the Invention

The following solutions and emulsions were prepared:
Solution I.5.1:
  30.9 g of acrylic acid (a.1) in 134 g of distilled water
Emulsion I.5.2:
  48.5 g of acrylic acid (a.1), 76.8 g of tert-butyl methacrylate (b.1), 297.3 g of 2-ethylhexyl acrylate (c.1) and 1.4 g of tert-dodecyl mercaptan were emulsified with the aid of
  17.5 g of a 15% by weight aqueous solution of sodium laurylsulfate and
  35.1 g of a 32% by weight aqueous solution of the sodium salt of a sulfuric acid monoester of $C_{16}$-ethoxylates (on average 30 mol of ethylene oxide/mole) in 258.7 ml of distilled water.
Solution I.5.3:
  9.5 g of $Na_2S_2O_8$ were dissolved in 125.7 ml of distilled water.

140.6 ml of distilled water and 7.5 g of a 15% by weight aqueous solution of sodium laurylsulfate were initially taken in a 2 liter stirred vessel having a plurality of feeds, a reflux condenser and a gas inlet tube. Thereafter, nitrogen was allowed to bubble through the initially taken mixture for 15 minutes and heating to 90° C. was effected with stirring.

Thereafter, the addition of solution I.5.3 was begun and said solution was added dropwise in the course of 2.75 hours. About 3 minutes after the beginning of the addition of solution I.5.3, the addition of solution I.4.1 was begun, which solution was metered in the course of 30 minutes. Thereafter, the addition of emulsion I.4.2 was begun. Emulsion I.5.2 was added in the course of 2 hours, stirring being continued. Stirring was effected for a further 60 minutes at 90° C. and thereafter 110.1 g of a 25% by weight aqueous sodium hydroxide solution were added in the course of 15 minutes. Cooling to room temperature was then effected. An aqueous dispersion according to the invention having a solids content of 42.9% and a pH of 4.9 was obtained. Copolymer (A.5) according to the invention had an average molecular weight $M_w$ of 86 000 g/mol.

I.6 Preparation of Comparative Copolymer (V-CP.6)
Solution I.6.1:
  44 g of acrylic acid (a.1) in 102.6 g of distilled water
Emulsion I.6.2:
  42.2 g of acrylic acid (a.1), 66.8 g of n-butyl methacrylate, 258.6 g of 2-ethylhexyl acrylate (c.1) and 12.3 g of n-dodecyl mercaptan were emulsified with the aid of 15.2 g of a 15% by weight aqueous solution of sodium laurylsulfate and 30.5 g of a 32% by weight aqueous solution of the sodium salt of a sulfuric acid monoester of $C_{16}$-ethoxylates (on average 30 mol of ethylene oxide/mole) in 225.1 ml of distilled water.
Solution I.6.3:
  8.2 g of $Na_2S_2O_a$ were dissolved in 109.4 ml of distilled water.

195.6 ml of distilled water and 6.5 g of a 15% by weight aqueous solution of sodium laurylsulfate were initially taken in a 2 liter stirred vessel having a plurality of feeds, a reflux condenser and a gas inlet tube. Thereafter, nitrogen was allowed to bubble through the initially taken mixture for 15 minutes and heating to 80° C. was effected with stirring.

Thereafter, the addition of solution I.6.3 was begun and said solution was added dropwise in the course of 4.5 hours. 3 minutes after the beginning of the addition of solution I.6.3, the addition of solution I.6.1 was begun, which solution was metered in the course of 60 minutes. Thereafter, the addition of emulsion I.6.2 was begun. Emulsion I.6.2 was added in the course of 3 hours with stirring. Stirring was effected for a further 90 minutes at 80° C., then cooling to 50° C. was effected and thereafter 47.9 g of a 50% by weight aqueous sodium hydroxide solution were added in the course of 30 minutes. Cooling to room temperature was then effected. An aqueous dispersion having a solids content of 40.2% was obtained. Copolymer (V-CP.6) had an average molecular weight $M_w$ of 10 100 g/mol.

I.7 Preparation of Copolymer (A.7) According to the Invention
Solution I.7.1:
  38 g of acrylic acid (a.1) in 25.3 g of distilled water
Emulsion I.7.2:
  36.4 g of acrylic acid (a.1), 57.6 g of tert-butyl methacrylate (b.1), 223.0 g of 2-ethylhexyl acrylate (c.1), 53.2 g of α-$C_{15}H_{32}$ (d.1) and 1.2 g of tert-dodecyl mercaptan were emulsified with the aid of
  15.6 g of a 15% by weight aqueous solution of sodium laurylsulfate and
  31.3 g of a 32% by weight aqueous solution of the sodium salt of a sulfuric acid monoester of $C_{16}$-alkanol ethoxylate (on average 30 mol of ethylene oxide/mol) in 194.0 ml of distilled water.
Solution I.7.3:
  8.2 g of $Na_2S_2O_8$ were dissolved in 108.4 ml of distilled water.

105.5 ml of distilled water and 6.7 g of a 15% by weight aqueous solution of sodium laurylsulfate were initially taken in a 2 liter stirred vessel having a plurality of feeds, a reflux condenser and a gas inlet tube. Thereafter, nitrogen was allowed to bubble through the initially taken mixture for 15 minutes and heating to 90° C. was effected with stirring.

Thereafter, the addition of solution I.7.3 was begun and said solution was added dropwise in the course of 2.75 hours. About 3 minutes after the beginning of the addition of solution I.7.3, the addition of solution I.7.1 was begun, which solution was metered in the course of 30 minutes. Thereafter, the addition of emulsion I.7.2 was begun. Emulsion I.7.2 was added in the course of 2 hours, further stirring being effected. Stirring was effected for a further 60 minutes at 90° C. and thereafter 82.6 g of a 25% by weight aqueous sodium hydroxide solution were added in the course of 30 minutes. Cooling to room temperature was then effected. An aqueous dispersion of copolymer (A.7) according to the invention having a solids content of 38.4% and a pH of 4.9 was obtained. The viscosity was 3185 mPa·s, determined according to DIN EN ISO 2555 (Brookfield DV-E viscometer, spindle No. 3 of the RV spindle set, 50 rpm).

TABLE 1

Characterization of the copolymers according to the invention and of a comparative copolymer

| Co-polymer | (a.1) [% by weight] | (b), [% by weight] | (c.1) [% by weight] | (d.1) | $M_w$ [g/mol] | Solids content [%] | pH |
|---|---|---|---|---|---|---|---|
| (A.1) | 21.0 | (b.1), 16.2 | 62.8 | — | 10 400 | 40 | 5.0 |
| (A.2) | 12.3 | (b.2), 21.0 | 66.7 | — | 9200 | 43.4 | 5.1 |
| (A.3) | 21.3 | (b.3), 14.9 | 63.8 | — | 9100 | 40.7 | 4.9 |
| (A.4) | 12.2 | (b.4), 21.7 | 66.1 | — | 9100 | 42.8 | 5.1 |
| (A.5) | 21.0 | (b.1), 16.2 | 62.8 | — | 86 000 | 42.9 | 4.9 |
| V-CP.6 | 21.0 | x | 62.8 | — | 10 100 | 40.2 | 5.0 |
| (A.7) | 18.2 | (b.1), 14.1 | 54.6 | 13.0 | n.d. | 38.4 | 4.9 |

For the preparation of V-CP.6, 16.2% by weight of n-butyl methacrylate was used instead of a comonomer (b).
n.d.: not determined

II. Use Examples

II.1 Production of Chromium-Free Furniture Leather

Data in % are always % by weight and are based on the pickled pelt, unless expressly stated otherwise. In the case of formulations of active substances, the values in % are always based on the solids content or active substance content.

A south German cattle hide was converted into a corresponding semifinished product (wetwhite) with 2.5% of glutaraldehyde and 3% of sulfone tanning agent from EP-B 0 459 168, Example K1. After this pretanning, the pH of the liquor was 3.9. After partial drying, the semifinished products were shaved to a thickness of 1.0 mm and cut into five strips of about 400 g each.

In separate drums, the strips were treated with in each case 100% of water, 6% of sulfone tanning agent from EP-B 0 459 168, Example K1, 4% of tara (vegetable tanning agent), 2.5% of Relugan® EH-S (resin tanning agent) and 1.5% of dye according to Example 4.18 from EP-B1 0 970 148 for 60 minutes at from 25° C. to 30° C. in the drum at 10 revolutions per minute. Thereafter, a pH of 3.6 was established with formic acid and the liquor was changed after a further 20 minutes. In each case 5% of the dispersions of the copolymers (A.1) to (A.5) according to the invention described in Example 1.1 to 1.5 or 5% of a 40% by weight aqueous solution of V-CP.6 is metered into the fresh liquor (100%) followed by 4% of fatliquor according to WO 03/023069, Example A, 1% of Lipamin® OK and a further 1.5% of dye according to Example 4.18 from EP-B1 0 970 148. After a drumming time of a further 60 minutes, acidification was effected with formic acid to a pH of 3.2 and appropriate samples were taken before the liquor was discharged. The leathers are washed twice with 100% of water each time, stored moist overnight, partially dried and then dried on a toggle frame at 50° C. After staking, the leathers L.1 to L.5 according to the invention and V-L.6 were assessed as below.

The rating was based on a rating system from 1 (very good) to 5 (poor). The liquor exhaustion was rated visually according to the criteria of residual dye (extinction) and turbidity.

1.5% of sodium formate and 0.5% of sodium bicarbonate and 1% of naphthalenesulfonic acid/formaldehyde condensate, prepared according to U.S. Pat. No. 5,186,846, Example "Dispersant 1" are added to the strips in a drum (50 l) and with a liquor length of 200% (based on shaved weight) at intervals of 10 minutes. After 70 minutes, the liquor was discharged. The strips were then distributed over separate drums for drumming.

The separate drums for drumming were then loaded with 100% of water (from 25 to 35° C.). Thereafter, 5% of a 40% by weight aqueous polymethacrylic acid solution ($M_n$ 30 000 g/mol, pH 5.5) was added. Drumming was effected for 20 minutes and in each case 2% of sulfone tanning agent from EP-B 0 459 168, Example K1, and 4% of vegetable tanning agent Mimosa were subsequently metered. After 60 minutes, 2% of a 50% by weight (solids content) aqueous solution of dyes was metered, the solids of which solution had the following composition:

70 parts by weight of dye from EP-B 0 970 148, Example 2.18, 30 parts by weight of Acid Brown 75 (iron complex), Color Index 1.7.16

In the meantime, the copolymer solutions mentioned in Table 1 were preemulsified with a polysiloxane of the formula

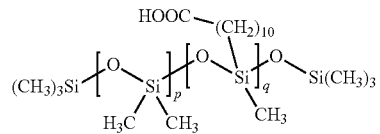

as a random cocondensate with q=3 and p=145 (average values in each case), kinematic viscosity 600 mm²/s at 20° C., and N-oleylsarcoside (C.1) in the weight ratio of in each case 3:2:0.2 with the aid of a stirring rod. The five emulsions EM.1 to EM.5 according to the invention were obtained. It was found that the emulsions thus obtainable and based on the

TABLE 2

Properties of leathers according to the invention and comparative leather

| Leather | Co-polymer | Fullness | Softness | Grain tightness | Liquor exhaustion | Dye penetration (section) | Levelness of dyeing |
|---|---|---|---|---|---|---|---|
| L.1 | (A.1) | 1.5 | 1 | 2 | 2 | 2 | 1.5 |
| L.2 | (A.2) | 2 | 2 | 2.5 | 2.5 | 2 | 2 |
| L.3 | (A.3) | 2 | 2.5 | 1.5 | 1.5 | 1.5 | 1.5 |
| L.4 | (A.4) | 2 | 1.5 | 2 | 2 | 1.5 | 2 |
| L.5 | (A.5) | 1.5 | 1 | 2 | 2 | 2 | 1.5 |
| V-L.6 | V-CP.6 | 3 | 3.5 | 2.5 | 2.5 | 2.5 | 3 |

The test results show the copolymers according to the invention and in particular those having tert-butyl groups to be outstanding synthetic polymer liquor. The very natural hand, without the rubber-elasticity of the leathers which is otherwise typical of polymers, as is frequently observed in the case of simple polyacrylates and polymethacrylates (in the negative sense), was also striking. The penetration of dye into the leather and levelness, which were rated as good or very good throughout, indicate an additional, dispersing effect of the copolymers according to the invention.

II.2 Production of Water-Repellent Upper Leathers

Two commercially available cattle Wetblue (from Packer, USA) were shaved to a thickness of 1.7-1.9 mm. The core region was cut into five strips of about 800 g each. Thereafter, copolymer dispersions according to the invention had no tendency at all toward phase separation over three days, whereas phase separation occurred after only about 5 h in the case of an emulsion which was prepared with V-CP.6.

7% of a freshly prepared emulsion was then added at 50° C. to each separate drum, in each case EM.1 being added to the leather produced using copolymer (A.1), and drumming was effected for 60 minutes. Acidification to a pH of 3.5 is then effected again with formic acid in a plurality of steps and drumming is effected at this pH for a further 20 minutes and the liquor is discharged. In fresh liquor (100%-150%), fixing is effected at 40° C. with 3% of commercially available chromium sulfate (Chromitan® B, 33% basic, $Cr_2O_3$ content: 27%) over a duration of 90 minutes. Thereafter, washing was effected twice with 150% of water each time and the leathers were stored overnight and then set out, vacuum-dried, conditioned and staked. The leathers L.7 to L.11 according to the invention and the comparative leather V-L.12 were obtained. The rating was effected according to a marking system of 1 (very good) to 5 (poor).

The results are listed together with the ratings of the leather in Table 3.

TABLE 3

Properties of the leathers L.7 to L.11 according to the invention and of the comparative leather V-L.12

| Leather | Co-polymer | Fullness | Softness | Grain tightness | Levelness of dyeing and fat distribution | Static water absorption [% $H_2O$] | Maeser [flexes] |
|---|---|---|---|---|---|---|---|
| L.7 | (A.1) | 1 | 1.5 | 1 | 1 | 19 | >100 000 |
| L.8 | (A.2) | 2 | 2 | 2.5 | 2 | 21 | 48 000 |
| L.9 | (A.3) | 2 | 2.5 | 1.5 | 1.5 | 25 | 27 000 |
| L.10 | (A.4) | 2 | 2 | 2 | 2 | 24 | 34 000 |
| L.11 | (A.5) | 1.5 | 1.5 | 1 | 1 | 19 | >100 000 |
| V-L.12 | V-CP.6 | 3 | 4 | 2.5 | 3 | 29 | 11 000 |

The Maeser values were determined using a Maeser tester according to ASTM D 2099, in each case and double determinations. For determining the static water absorption, the leather was completely immersed in water over a period of 60 minutes.
The static water absorption is based on the finished leather. The dyeing was assessed by visual inspection by a team of test persons. The ratings were effected on the basis of a school marking system: 1 (very good) to 6 (inadequate).

II.3 Further Examples for the Production of Upper Leather

Half of a commercially available cattle Wetblue (from Packers, USA) was shaved to a thickness of 2.0-2.1 mm. The core region was cut into 4 strips of about 600 g. The strips were first washed in a drum (200% water) and then neutralized with 2% by weight of sodium formate and 0.5% by weight of sodium bicarbonate in 50% by weight of water at 35° C. over a period of 90 minutes. After the neutralization, the leathers were washed with 200% by weight of water and distributed over four drums.

75% by weight of water and 3% of a 40% by weight polymethacrylic acid solution ($M_n$ 30 000 g/mol, pH 5.5) were added to each of the drums. After a drumming time of 20 min, a mixture of 5% of vegetable tanning agent (Mimosa) and 2% of sulfone tanning agent from EP-B 0 459 168, Example K1, was added. After a drumming time of a further 20 min, 2% of a 50% by weight (solids content) aqueous solution of dyes were metered in, the solids of which had the following composition:

70 parts by weight of dye from EP-B 0 970 148, Example 2.18, 30 parts by weight of Acid Brown 75 (iron complex), Color Index 1.7.16

A further 20 min later, 6% of emulsion EM.6 or EM.7 according to the invention, prepared from a solution of copolymer (A.1) according to the invention, according to Example I.1, a silicone oil S.1 or S.2 (polydimethylsiloxane oil), kinematic viscosity 50 mm²/s or 350 mm²/s, respectively, at 25° C., and the sodium salt of N-oleylsarcoside in the weight ratio of 3:1:0.2 were metered. Emulsions EM.6 and EM.7 according to the invention are storage-stable at room temperature, 40° C. and 60° C. over 7 days in each case.

Drumming was effected for 60 minutes. Thereafter, a further 75% of water at a temperature of 60° C. were metered in. Finally, acidification was effected with HCOOH in a plurality of steps to a pH of about 3.6. The liquor was discharged and washing was effected with 200% of water. Thereafter, fixing was effected in a fresh liquor of 100% with 3% of alkali-free chrome tanning agent, basicity 40. The drumming time was 90 min and the temperature 40° C. Thereafter, washing was effected twice with 200% of water each time. The leathers were stored overnight, then set out, dried under reduced pressure, conditioned and staked.

The results are listed together with the leather ratings in Table 3a.

TABLE 3a

Properties of the leathers L.13 to L.16 according to the invention.

| Leather | Silicone oil | Fullness | Softness | Grain tightness | Dyeing | Static water absorption | Maeser [flexes] |
|---|---|---|---|---|---|---|---|
| L.13 | S.1 | 2 | 1-2 | 1-2 | 2 | 22 | 30 000 |
| L.14 | S.2 | 2 | 2 | 2 | 2-3 | 22 | 17 000 |

Rating: 1 (very good)-5 (poor)
Static water absorption: stated in % by weight of absorbed $H_2O$ The Maeser values were carried out using a Maeser tester according to ASTM D 2099. For determining the static water absorption, the leather was immersed completely in water over a period of 60 minutes. The dyeing was assessed visually.

II.4 Production of Apparel Leather, Glove Leather and Upholstery Leather

Emulsions according to the invention having compositions according to Table 4 were prepared analogously to the preparation of EM.1. The lacking part to 100% was in each case water.

TABLE 4

Composition of emulsions EM.8 to EM.10 according to the invention

| Number | (A.1), [% by weight] | Polysiloxane [% by weight] | (C), [% by weight] |
|---|---|---|---|
| EM.8 | 50 | 2 | (C.2), 10 |
| EM.9 | 50 | 2 | (C.3), 10 |
| EM.10 | 50 | 2 | (C.4), 10 |
| EM.11 | 50 | 2 | (C.4), 10 |

(A) designates the amount of dispersion according to Example I.1 of copolymers (A) according to the invention, in g.
Polysiloxane is the polysiloxane from Example II.2 of the present application, in g.
(C.2): n-$C_{18}H_{37}$—(O—$CH_2CH_2$)$_3$—O—$PO_3Na_2$
(C.3): n-$C_{12}H_{25}$—(O—$CH_2CH_2$)$_3$—O—$PO_3Na_2$
(C.4): cis-$CH_3(CH_2)_7$—CH=CH—$(CH_2)_8$—O—PO(OH)$_2$ Half of a commercially available cattle Wetblue (from Packers, USA) was shaved to a thickness of 2.0-2.1 mm. The core region was cut into 3 strips of about 700 g. The strips were first washed in a drum (200% water) and then neutralized with 2% by weight of sodium formate and 0.5% by weight of sodium bicarbonate in 50% by weight of water at 35° C. over a period of 90 minutes. After the neutralization, the leathers were washed with 300% by weight of water and distributed over three drums.

100% by weight of water and 3% of a 40% by weight polymethacrylic acid solution ($M_n$ 30 000 g/mol, pH 5.5) and 6% of a vegetable tanning agent Mimosa were added to each of the drums. After a drumming time of 20 min, 2% of sulfone tanning agent from EP-B 0 459 168, Example K1, were added. After a drumming time of a further 30 min, 2% of a 50% by weight (solids content) aqueous solution of dyes were metered, the solids of which had the following composition:

70 parts by weight of dye from EP-B 0 970 148, Example 2.18, 30 parts by weight of Acid Brown 75 (iron complex), Color Index 1.7.16

A further 60 min later, 10% of emulsion EM.8 or EM.9 or EM.10 according to the invention were metered.

Drumming was effected for 60 minutes. Thereafter, a further 100% of water at a temperature of 60° C. were metered in. Finally, acidification was effected with HCOOH in four steps to a pH of about 3.7. The liquor was discharged and washing was effected with 300% of water. Thereafter, fixing was effected in a fresh liquor of 150% with 4% of alkali-free chrome tanning agent, basicity 40. The drumming time was 90 min and the pH was 3.4 and the temperature 40° C. Thereafter, washing was effected twice with 300% of water (25° C.) each time. The leathers were stored overnight, then set out, dried under reduced pressure, conditioned and staked.

The results are listed together with the leather assessments in Table 5.

TABLE 5

Properties of the leathers L.17 to L.19 according to the invention

| Leather | Softness | Fullness | Maeser [flexes] | Static water absorption [%] |
|---|---|---|---|---|
| L.17 | 1 | 2 | 5000 | 21 |
| L.18 | 1 | 2 | 8000 | 17 |
| L.19 | 1.5 | 2 | 5000 | 23 |
| L.20 | 1.5 | 3 | 5300 | 20 |

Excellent soft water-repellent leathers which had very tight-grain character and were very suitable for soft upper leathers (nappa, floater) and furthermore for pieces of apparel, in particular gloves, and for furniture parts, in particular seats and sofas, were obtained.

It was found that the leathers according to the invention did not have an "excessively fatty" feel.

III. Use of Copolymers According to the Invention as Emulsifiers

III.1 Preparation of Silicone Emulsions

The copolymers (A.1) to (A.3) shown in Table 1 were used in the form of their aqueous dispersions according to Examples I.1 to I.3 for emulsifying a polysiloxane of the formula

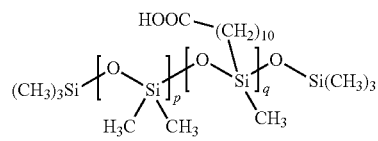

(random cocondensate with q=3 and p=145, in each case average values), kinematic viscosity 600 mm$^2$/s at 20° C. For this purpose, 250 g of the copolymers (A.1) to (A.3) according to the invention were initially taken as an aqueous solution in each case in a beaker and preemulsified at 40° C. with 70 g of the abovementioned polysiloxane using an Ultraturrax.

Thereafter, in each case 5 g (1.6% by weight) of N-oleylsarcoside were also added and homogenization was effected at 60° C. by means of an Ultraturrax and the pH was adjusted to 7.5 to 8.5 with NaOH. The emulsions (Em.1) to (Em.3), which were subjected to a storage test at 40° C., were obtained. In comparison with an aqueous emulsion with addition of 7.5% by weight of N-oleylsarcoside and 5% by weight of n-$C_{18}H_{37}$—(OCH$_2$CH$_2$)$_{50}$OH, the storage stability until the occurrence of visible creaming (phase separation) increased by a factor of from 7 to 20 to up to 12 months.

III.2. Preparation of Wax Dispersions 500 g of copolymer (A.2) according to the invention were initially taken in a stirred tank. At 60° C., altogether 80 g of molten Carnauba wax (80° C.) were stirred in three portions. 1% by weight of N-oleylsarcoside was also used as a cosurfactant. Cooling to 30° C. was effected in the course of 30 minutes with uniform stirring (200 rpm). The storage-stable emulsion (Em.4) according to the invention was obtained.

Emulsion (Em.5) according to the invention: 500 g of copolymer (A.3) according to the invention were initially taken in a stirred tank. At 50° C., 90 g of white oil (commercially available as Tudalen® 3036) and 5 g of n-$C_{18}H_{37}$—(OCH$_2$CH$_2$)$_{50}$OH were stirred in by means of a two-blade anchor stirrer (200 rpm).

The emulsions (Em.4) and (Em.5) according to the invention could be used by themselves and preferably in the mixing ratio (Em.4) to (Em.5) 10/1 to 3/1 (volume ratio) as leather care compositions and as pullup oil.

Emulsion (Em.5) according to the invention could serve as a base component for formulating cutting and cooling fluids for metal processing. Here, in particular the anticorrosive effect of the copolymer (A.3) according to the invention is advantageous.

The invention claimed is:

1. A process for the production of leather, said process comprising treating pelts, pickled pelts or semifinished products with at least one copolymer (A) obtained by copolymerization of comonomers consisting of:
    (a) at least one ethylenically unsaturated $C_3$-$C_{10}$-carboxylic acid or at least one ethylenically unsaturated $C_4$-$C_{10}$-dicarboxylic acid or its anhydride,
    (b) at least one (meth)acrylate of an α-branched $C_3$-$C_{10}$-alkanol,
    (c) at least one (meth)acrylate of a primary $C_4$-$C_{20}$-alkanol.

2. The process according to claim 1, wherein at least one comonomer (b) is a (meth)acrylate of a tertiary $C_4$-$C_{10}$-alkanol.

3. The process according to claim 1, wherein at least one comonomer (c) is a (meth)acrylate of a primary β- or γ-branched $C_4$-$C_{20}$-alcohol.

4. The process according to claim 1, wherein at least one comonomer (b) is a methacrylate of a tertiary $C_4$-$C_{10}$-alkanol and at least one comonomer (c) is an acrylate of a primary β- or γ-branched $C_4$-$C_{20}$-alcohol.

5. The process according to claim 1, wherein copolymer (A) is obtained by copolymerization of
   a. altogether from 5 to 30% by weight of ethylenically unsaturated $C_3$-$C_{10}$-carboxylic acid or ethylenically unsaturated $C_4$-$C_{10}$-dicarboxylic acid or its anhydride,
   b. altogether from 5 to 30% by weight of (meth)acrylate of α-branched $C_3$-$C_{10}$-alkanol,
   c. altogether from 40 to 90% by weight of (meth)acrylate of primary $C_4$-$C_{20}$-alkanol.

6. The process according to claim 1, wherein ethylenically unsaturated $C_3$-$C_{10}$-carboxylic acid (a) incorporated in the form of polymerized units or ethylenically unsaturated $C_4$-$C_{10}$-dicarboxylic acid (a) incorporated in the form of polymerized units is present in at least partly neutralized form.

7. The process according to claim 1, wherein the anhydride of ethylenically unsaturated $C_4$-$C_{10}$-dicarboxylic acid (a) which is incorporated in the form of polymerized units is present in at least partly hydrolyzed and, if necessary, at least partly neutralized form.

8. The process according to claim 1, wherein copolymer (A) is a random copolymer.

* * * * *